United States Patent
Khaitov et al.

(10) Patent No.: US 12,444,102 B2
(45) Date of Patent: Oct. 14, 2025

(54) METHOD FOR GENERATING EDGE CURVE FOR DENTAL DEVICES

(71) Applicant: 3SHAPE A/S, Copenhagen K (DK)

(72) Inventors: Marat Khaitov, Copenhagen K (DK); Karl-Josef Hollenbeck, Copenhagen Ø (DK)

(73) Assignee: 3SHAPE A/S, Kobenhavn K (DK)

( * ) Notice: Subject to any disclaimer, the term of this patent is extended or adjusted under 35 U.S.C. 154(b) by 583 days.

(21) Appl. No.: 17/782,253

(22) PCT Filed: Dec. 4, 2020

(86) PCT No.: PCT/EP2020/084681
§ 371 (c)(1),
(2) Date: Jun. 3, 2022

(87) PCT Pub. No.: WO2021/110938
PCT Pub. Date: Jun. 10, 2021

(65) Prior Publication Data
US 2023/0005196 A1    Jan. 5, 2023

(30) Foreign Application Priority Data
Dec. 6, 2019 (DK) .......................... PA 2019 70753

(51) Int. Cl.
*G06T 7/13* (2017.01)
*A61C 7/00* (2006.01)
(Continued)

(52) U.S. Cl.
CPC ............ *G06T 11/203* (2013.01); *A61C 7/002* (2013.01); *A61C 7/08* (2013.01); *A61C 13/34* (2013.01);
(Continued)

(58) Field of Classification Search
CPC ......... G06T 11/203; G06T 7/13; G06T 17/20; G06T 2210/12; A61C 7/002; A61C 7/08; A61C 13/34; G06F 30/17
See application file for complete search history.

(56) References Cited

U.S. PATENT DOCUMENTS 5,257,203 A    10/1993    Riley et al.
10,466,676 B1    11/2019    Do et al.
(Continued)

FOREIGN PATENT DOCUMENTS

CN    108371563 A    8/2018
WO    2020180833 A1    9/2020

OTHER PUBLICATIONS

Breen et al. "Oral somatosensatory acuity is related to particle size perception in chocolate", Nature Scientific Reports, May 15, 2019, vol. 9, No. 7437, pp. 1-10.
(Continued)

*Primary Examiner* — Daniel F Hajnik
*Assistant Examiner* — Adeel Bashir
(74) *Attorney, Agent, or Firm* — Buchanan Ingersoll & Rooney PC

(57) ABSTRACT

According to an embodiment, a computer-implemented method for generating an edge curve to facilitate manufacture of at least a portion of a dental device is disclosed. The method includes identifying at least one tooth reference point for each of at least two teeth on a dental model; identifying at least one offset point corresponding to each of the at least one tooth reference points such that the at least one offset point is on a gingival surface of the dental model and located outside an interproximal area; and generating the edge curve by connecting the offset points such that the edge curve is outside the interproximal area and on the gingival surface.

15 Claims, 15 Drawing Sheets

(51) Int. Cl.
    *A61C 7/08*     (2006.01)
    *A61C 13/34*     (2006.01)
    *G06F 30/17*     (2020.01)
    *G06T 11/20*     (2006.01)
    *G06T 17/20*     (2006.01)

(52) U.S. Cl.
    CPC ................ G06F 30/17 (2020.01); G06T 7/13 (2017.01); G06T 17/20 (2013.01); *G06T 2210/12* (2013.01)

(56) References Cited

U.S. PATENT DOCUMENTS

| | | | |
|---|---|---|---|
| 2004/0175671 | A1 | 9/2004 | Jones et al. |
| 2008/0077270 | A1 | 3/2008 | Maier et al. |
| 2008/0215176 | A1* | 9/2008 | Borovinskih .......... B33Y 50/02 700/117 |
| 2010/0173266 | A1 | 7/2010 | Lu et al. |
| 2011/0104630 | A1* | 5/2011 | Matov .................... A61C 9/004 703/1 |
| 2019/0259219 | A1* | 8/2019 | Lancelle ................. G06T 19/20 |
| 2020/0000551 | A1* | 1/2020 | Li .......................... A61C 7/002 |
| 2020/0020728 | A1 | 1/2020 | Ammo et al. |
| 2020/0125069 | A1* | 4/2020 | Sirovskiy ............... A61C 7/002 |
| 2020/0281689 | A1* | 9/2020 | Yancey ................ A61B 5/0064 |

OTHER PUBLICATIONS

Shamir "A Survey on Mesh Segmentation Techniques" Computer Graphics Forum, May 2007, vol. xx (200y), No. 7, pp. 1-17.
Bartels et al., "An Introduction to Splines for Use in Computer Graphics and Geometric Modeling", Morgan Kaufmann Publishers, Inc., 1995, Chapter 3. (10 pages).
Ericson, "Real-time Collision Detection". CRC Press, 2004, Chapters 6, 7, and 8. (147 pages).
International Search Report (PCT/ISA/210) and Written Opinion (PCT/ISA/237) mailed on Feb. 16, 2021, by the European Patent Office as the International Searching Authority for International Application No. PCT/EP2020/084681.

\* cited by examiner

METHOD FOR GENERATING EDGE CURVE FOR DENTAL DEVICES

FIELD

This disclosure generally relates to a system and method for generating an edge curve to facilitate cutting a dental device using offset points.

BACKGROUND

Dental devices such as clear aligners and retainers include polymeric shell dental devices that can be placed and removed over a patient's dentition. Such devices are frequently made by fitting polymeric material over a dental cast, for example, by placing a thermoplastic over a physical dental cast and/or model and shaping the thermoplastic by changing its temperature. The physical dental model may come from traditional dental methods, for example, a plaster cast of a dental impression taken directly from a patient, or digital dentistry, such as a three-dimensional print based on a three-dimensional scan of a patient's teeth. The physical dental model may also have been altered, for example, to reflect a desired tooth alignment rather than the patient's existing tooth alignment.

Once fitted, excess material is removed from the polymeric shell dental appliances before use. This is often done by cutting, with the dental device edge determined by a dental technician. This process is often done by hand, and can be time-consuming and labor-intensive. Further, this cutting process relies on the choices of a technician, and may produce inconsistent results.

SUMMARY

Disclosed is a computer-implemented method for generating an edge curve to facilitate generating the edge for at least a portion of a dental device, said method comprising:
  identifying at least one tooth reference point for each of at least two teeth on a dental model;
  identifying at least one offset point corresponding to each of said at least one tooth reference points such that said at least one offset point is on a gingival surface of said dental model and positioned outside an interproximal area; and
  generating said edge curve by connecting the offset points such that the edge curve is outside the interproximal area and on the gingival surface.

The at least two teeth may include adjacent teeth or teeth which are separated by one or more teeth.

The method disclosed digitally generates an edge curve, a curve on a dental model to facilitate generating an edge or portion thereof for a dental device. In one embodiment, the edge curve is used to facilitate cutting an edge for a polymeric shell dental device. In one embodiment, the edge curve defines the edge of three-dimensionally printed dental device. The method reduces the time and labor required to prepare a dental device for a patient to use. Further, the use of offset points allows more precise control over the shape of the dental device.

Since the precise offset distances may be set, edge curves can be consistent across dental devices. This can help both dental technicians maintain consistency in their own work, as well as allowing patients to specify their preferences. For example, in orthodontic treatment by clear aligner, a sequential series of clear aligners gradually changes the position of a patient's teeth. A patient may prefer an offset distance of 0.15 mm from the tooth reference points, for example; with the method disclosed, the entire series of clear aligners may have the same offset distance, even if made by different dental technicians.

A dental model is a representation of teeth, gingiva, palate, jaws, and/or other items in the mouth, such as brackets, crowns, and/or veneers. Examples of a dental model include but are not limited to: a three-dimensional scan of a dental cast and/or model, and/or a generated three-dimensional dental model, for example, as part of a treatment plan. Three-dimensional scans may be used in making dental splints, retainers, and/or indirect bonding trays. Generated three-dimensional models are useful in designing orthodontic treatments.

A tooth reference point is a point in, on, and/or within 0.5 mm of the tooth. It may be from the list including but not limited to: anatomical features including but not limited to crown centers, cusps, grooves, occlusal points, pits, and/or visible apices; calculated features including but not limited to a point on an axis such as a tooth long axis and/or midpoints such as a mesial-distal midpoint; geometrical features including but not limited to geometric centers and/or points on axes; technical features including but not limited to orthodontic brackets; a projection to the surface derived from one or more of the above; and/or a translation of any of the above.

According to an embodiment, the method identifies at least one tooth reference point on at least two teeth on a dental model. One embodiment uses as the tooth reference point a visible apex of the tooth, discussed below.

Next, an offset point is identified for each tooth reference point. Offset describes the location of an object compared to another object. An offset point is a point with a location based on the location of a corresponding dental model point. A dental model point is a point in, on, and/or within a specific distance such as 0.5 mm of the dental model. A dental model points may be, for example, a tooth reference point, a control point (as discussed below), or a pre-identified offset point. There may be multiple offset points for a single dental model point. Offset points are used to generate an edge curve.

There are a number of ways an offset point may be identified. An embodiment identifies an offset point by translating a dental model point along a surface, where the translated dental model point is identified as the offset point. An embodiment identifies an offset point by translating a dental model point in a direction and then projecting the translated dental model point on to the surface, where the projected, translated dental model point is identified as the offset point.

To find an offset point, first, a tooth reference point may be translated in the offset direction by the offset distance, with the translation represented by an offset vector. For example, the direction of the offset vector, typically along a long axis, may be directed away from the occlusion and towards the gingiva associated with the tooth. Translated tooth reference point may be inside the gingiva, and needs to be projected back onto the gingival surface. There are several methods to project a dental model point on to the surface, e.g. using a projection direction, or finding the nearest point on the correct surface. Further details are discussed below.

Finally, the edge curve is fitted through the offset points. In one embodiment, the edge curve is a spline. A spline is a curve that connects particular points; it is defined by a special function that is defined piecewise by other functions. Methods for fitting a spline include but are not limited to:

polynomial curve fitting including but not limited to square splines, and/or cubic splines including cubic Hermite splines; and/or trigonometrical splines including but not limited to Fourier series. See Bartels, 1995. The edge curve is outside the interproximal area, as discussed below.

In an embodiment, the method further comprises a step where the edge curve is projected on to the surface of the dental model, by sampling a number of points along the edge curve and selecting the nearest point on the surface of the dental model. This is discussed below.

There may be other factors in defining the curve, such as additional points, parameters, and post-processing. These are discussed further below.

The offset points may be used to define an edge curve for the entire edge of a dental device, or a portion of the edge of a dental device, for example, the lingual side only.

According to an embodiment, the disclosure further comprises, wherein the at least two teeth comprises a first tooth and a second tooth:
  identifying at least one control point in a region defined by at least three of: a first visible apex corresponding to a first tooth, a second visible apex corresponding to a second tooth, a first offset point corresponding to the first visible apex, and/or a second offset point corresponding to the second visible apex, the at least one control point lying on the gingival surface outside the interproximal area; and
  generating the edge curve by connecting the first offset point, the at least one control point, and the second offset point.

One embodiment defines the edge curve with at least one control point, in addition to the offset points. A control point is an additional point from a region defined by a selection of tooth reference points and/or offset points that helps define the edge curve. There may be multiple control points in the region. Multiple control points are particularly useful where there is a longer distance between tooth reference points, for example, where a tooth is missing or there is a large gap between teeth.

The region the control point comes from can vary. For example, a region may be a triangular region defined by visible apices from two teeth and an offset point, a rectangular region defined by two visible apices and two offset points, or a polygonal region defined by different points along lines between visible apices and/or offset points. It may also come from any of the boundaries of these, except a boundary between two adjacent visible apices.

One advantage of the at least one control point is that it allows for finer control of the shape of the edge curve. The edge curve can be tailored to better suit the dental device's environment, purpose, or patient, as discussed below. In particular, it allows the dental technician to control the waviness of the edge curve, as discussed below.

An embodiment further comprises:
  identifying said at least one control point based on a point between two offset points and/or tooth reference points, wherein said point between is projected onto the surface.

In one embodiment, a point between two points is calculated and projected back onto the surface. The two points may be offset points, tooth reference points, or a combination. The projected point between is identified as a control point. Details of projecting a point onto a surface are discussed below.

An embodiment further comprises identifying a visible apex by:
  identifying at least a part of a margin line of a tooth;
  identifying at least one margin line point along on said at least a part of a margin line;
  evaluating a measurement of each said at least one margin line point compared to a reference; and
  selecting as the visible apex a margin line point with an optimal measurement.

In one embodiment, a tooth reference point may be a visible apex. A visible apex is an optimum of the margin line of the tooth, e.g. the lowest point or highest point visible for the margin line and/or a portion of the margin line. An optimum can be identified by finding a point with an optimal measurement. The margin line of the tooth is boundary between tooth and gingiva.

A tooth can have more than one visible apex, for example, one on the buccal side, and one on the lingual side. The visible apex for a tooth provides a useful confluence of geometry and anatomy—it can be calculated from a three-dimensional scan or model, and as the lowest visible point on the tooth, can help ensure a tooth is fully covered by the dental device.

Connecting several visible apices can offer an approximation of the shape of the gingiva below the teeth, an useful marker in finding an edge curve.

The margin line of the tooth can be derived from segmenting a scan. For example, the surface normal of each facet may be evaluated; where there is a sudden change in direction over relatively few facets, there may be a point on the margin line between tooth and gingiva. In another embodiment, the roughness of a local area may be evaluated; relatively smooth areas are labeled as teeth, and rougher areas are labeled gingiva. The margin line is the boundary between these areas, Segmentation techniques using planarity, medial axis, convexity, shape diameter function, and curvature criteria are particularly useful, and are discussed in Shamir 2008.

A margin line point is a point on the margin line. Margin line points may be identified by various methods. In one embodiment, they may be the vertices or points of a three-dimensional scan or model nearest the margin line. In another, they are chosen at regular intervals on the margin line from a scan; fewer margin line points allow for faster computation. In another, the margin line points may be points from a spline approximating the margin line.

Where there is more than one margin line point, the margin line points may be separated into groups, for example, lingual margin line points and buccal margin line points.

A measurement of each margin line point is then evaluated compared to the reference. The measurement is a quantity that allows the comparison of margin line points to the reference, for example, a distance or a dot product.

The reference may generally be a stable feature for comparing measurements. The reference may be from the list comprising: anatomical features including but not limited to cusps, crown centers, occlusal points, pits, and/or grooves; calculated features including but not limited to an axis such as a tooth long axis, points on axes, and/or midpoints such as a mesial-distal midpoints; geometrical features including but not limited to geometric centers, axes, planes, and/or points on axes and/or planes; technical features including but not limited to orthodontic brackets; and/or a surface point derived from one or more of the above.

In one embodiment, the reference is a unit vector of the tooth long axis and the measurement is a dot product of the margin line point and the tooth long axis unit vector. Each margin line point has a set of Euclidean coordinates, e.g. x, y, and z coordinates. The dot product of the tooth long axis unit vector and the Euclidean coordinates of a margin line point is a length of projection of a segment that connects a margin line point and reference frame origin (here, at Euclidean coordinates (0,0,0)) on the tooth long axis unit vector; thus, it corresponds to a distance along the tooth long axis. The margin line point with the minimum dot product is the visible apex.

In one embodiment, the measurement is a Euclidean distance and the reference is the occlusal plane. Where each margin line point has a set of Euclidean coordinates, the distance from the occlusal plane is calculated. The optimal measurement is the maximum distance, and thus, the margin line point with the maximum distance is the visible apex.

According to an embodiment, a method for identifying a visible apex is disclosed. The method includes
identifying an offset plane; and
identifying at least one visible apex based on the offset plane.

In another embodiment, a visible apex may be determined with an offset plane. First, an offset plane is derived for example, as described above and also discussed later in relation to FIG. 8. This may be, for example, an occlusal plane based on the occlusal surface of an oral situation, or a mesial-distal plane of a tooth for which a visible apex is determined, as described above.

Next, at least one visible apex is identified based on that offset plane. As described below, this may be done by a number of methods e.g. by placing the offset plane in the gingiva and moving it towards the occlusal surface until it meets the margin line and/or reaches the first tooth point, i.e. transitions from gingiva to tooth, or by placing the offset plane at the occlusal surface and moving it away from the occlusal surface until it finds the last point where it meets the tooth, i.e. transitions from the tooth to gingiva. As the dental model undergoes the step of segmentation prior to this step of identifying the visible apex, dental objects like individual tooth and gingiva are distinctly and separately known.

The moving such as incremental moving of the offset plane may occur along a certain direction such as along the long axis of the tooth, or orthogonally to the offset plane itself, at least until the offset plane makes the transition from gingiva to tooth or vice verca. The transition may be determined by, for example tooth facet, i.e. a facet of the dental model that has been classified as tooth. Where tooth facets are used, the offset plane may intersect more than a single tooth facet. The visible apex may be where it intersects fewer tooth facets than the next incremental step, for a given region.

The point at which the offset plane meets the margin line or tooth facet is a visible apex. As there are visible apices on both the lingual and the buccal sides of a tooth, the offset plane may be further moved toward the occlusal surface to find the other visible apex. In another embodiment, an offset plate is limited to either the lingual or the buccal side, with a boundary along, e.g. the mesial distal axis, and the visible apex for each side is found with different offset planes.

An embodiment for identifying a visible apex further comprises:
selecting a dental model comprising at least one tooth or a jaw;
placing an offset plane at gingiva proximal to a tooth and beyond the margin line of the tooth/the tooth/the jaw in a direction away from its occlusal surface;
incrementally moving the offset plane toward the occlusal surface until the offset plane intersects a margin line or a tooth facet; and
identifying the visible apex as the intersection of the offset plane and the margin line or the tooth facet.

It is preferred that placing an offset plane at gingiva proximal to a tooth include the offset plane intersecting only the gingiva e.g. below the margin line on the lower jaw or above the margin line on the upper jaw.

In another embodiment, a visible apex for a tooth may be determined with an offset plane by placing an offset plane at the occlusal surface, and incrementally bringing it towards gingiva proximal to the tooth until the offset plane leaves the margin line or tooth tissue, i.e. transitions from the tooth to gingiva.

An embodiment for identifying a visible apex further comprises:
selecting a dental model comprising a tooth or a jaw;
placing an offset plane for the tooth or the jaw at the occlusal surface;
incrementally moving the offset plane away from the occlusal surface until the offset plane last intersects a tooth facet; and
identifying the visible apex as the last intersection of the offset plane and the tooth.

An embodiment further comprises selecting a dental model comprising a tooth based on tooth segmentation.

A dental model that has undergone tooth segmentation may also have a visible apex identified, by one of the methods discussed above. This allows the identification of visible apices for individual tooth in a dental model.

A dental model comprising more than one tooth may undergo tooth segmentation, i.e. segmenting the model into individual teeth. This may further be accompanied by identifying the teeth through a classification algorithm, e.g. PCA or a convolutional neural network. Once a tooth is identified in such a manner, it may be further segmented into buccal and lingual sides, e.g. by generating a plane between the long axis, a mesial point, and a distal point.

In an embodiment, the disclosure further comprises identifying at least one offset point by:
displacing a corresponding dental model point based on a offset distance and a offset direction, wherein a corresponding dental model point is an instance of the tooth reference points or the at least one control point.

As discussed above, an offset point is a point with a location based on the location of a corresponding dental model point.

The displacement of an offset point is calculated based on an offset distance and an offset direction. Different methods of displacement are discussed below.

The offset direction can be chosen in a number of ways, and need not be the same for each offset point. It may be based off an anatomical feature, such as the tooth long axis and/or the occlusal plane. It may be based on some geometrical information, such as planes of the dental model as a whole or centers of particular teeth. It may also be based on a calculation of any of the above, for example, an average of tooth long axes, or a normal of the occlusal plane. One embodiment uses a mathematical model to calculate a plane based on anatomical data, as discussed below.

The offset distance can be identified by a method from the list comprising: user input, calculation by algorithm, and/or standard values. The offset distance for an offset point based on a tooth reference point may typically be more than zero. In one embodiment, the minimum offset distance may be $10^{-18}$ mm, based on the minimum allowable threshold over zero in existing software for a 3D mesh. In another embodiment, the minimum offset distance may be $5 \times 10^{-3}$ mm, a difference in size detectable by the human mouth (Breen 2019. In another embodiment, the minimum offset distance may be $2\times10^{-2}$ mm, based on the potential error in precision of a milling machine.

The at least one offset point allows the creation of an edge curve that is based on a patient's anatomy, but can be modified to improve the function of a dental device. For example, generating an edge curve from offset points for a clear aligner allows a dental practitioner to control the fit and coverage of the clear aligner—a smaller offset distance means more flexibility, while a bigger offset distance means more coverage. By using offset points, the dental practitioner has more control over the treatment for the patient.

Multiple offset points may have the same offset distance, or different offset distances tailored to the situation. For example, the dental practitioner may want less coverage on the lingual side than the buccal side, and use a smaller offset distance on the lingual side. In another example, a patients' incisors may require more movement and therefore more coverage than the molars, so the incisors' offset distance is also larger than that of the molars.

An embodiment further comprises identifying the offset direction for an instance of the at least one offset point a by:
 identifying a set of dental model data;
 processing said dental model data using a mathematical model to generate an offset plane; and
 determining the offset direction based on the offset plane.

One embodiment identifies the offset direction for a particular offset point using an offset plane generated from a set of dental model data. Various mathematical models can also be used to generate the offset plane, including but not limited to: linear regression, polynomial regression, principle component analysis.

A set of dental model data is a collection of points in, on, and/or within 0.5 mm of the dental model that provide information about the dental model. Different sets of dental model data may provide different information about the tooth, and the dental model data set can be selected to solve the problem at hand. For example, where the dental model data is a collection of mesial and distal points of teeth, the dental model data would provide information about the orientation and location of teeth on a relevant portion of the jaw. Another embodiment may use the visible apices of the teeth as the dental model data, to determine a plane approximating the boundary of visible dentition.

One embodiment generates the offset plane using linear regression. In this embodiment, the offset plane is a flat plane that best fits the dental model data, for example, by minimizing the squared error of each point in the set of dental model data in relation to the plane.

Another embodiment generates the offset plane using polynomial regression. In particular situations, it is useful to have a curved plane rather than a flat plane. For example, while the occlusal plane is traditionally depicted as a flat plane, the jaw itself is curved, and a curved surface can provide a closer-fitting approximation of where the teeth occlude. Polynomial regression allows the offset plane to be a curve fitted to the dental data.

Another embodiment generates the offset plane using principle component analysis to generate a plane. A principle component analysis takes a data set, such as the set of dental model data, and finds the directions in which it has the greatest variation, the principle components. The first principle component is the direction that contains the most variation, and therefore the most information about the system, the second the second most, and so on. Two principle components can be used to generated a plane. A useful plane can be generated from the top two principle components of the dental model data.

Once the offset plane is identified, it can be used to guide the offset direction. In one embodiment, a vector orthogonal to the offset plane can be used as the offset direction. This is useful, because it can be applied to any dental model point, no matter its location. The offset direction is therefore indirectly based off anatomical information. Further, the same offset direction can be used for an entire set of data, allowing the data to move in unison.

In short, the offset plane can provide useful information about the anatomy of the dentition, in a manner suitable for efficient computation.

In an embodiment, the disclosure further comprises a method of displacement to identify the at least one offset point by:
 translating a corresponding dental model point along the surface of the dental model in the offset direction by the offset distance.

In one embodiment, the offset point is displaced by translating the corresponding dental model point directly on the surface of the gingiva. An offset direction is chosen. If the offset direction is not parallel to the surface, its dimensionality may be reduced such that it can travel along the surface. The corresponding dental model point is translated by the offset distance. In one embodiment, the offset distance is measured by the length of each path along the facets of the mesh of the three-dimensional scan or model.

An embodiment further comprises identifying at least one offset point by:
 translating said corresponding dental model point in the offset direction by the offset distance; and
 projecting translated said corresponding dental model point onto the surface.

In one embodiment, at least one offset point is generated by translating the corresponding dental model point in the offset direction by the offset distance, then projecting the translated corresponding dental model point back on to the surface.

The translated corresponding dental model point may be translated into the gingiva or tooth, or into empty space around the dental model. Thus, it needs to be projected back on to the surface of the dental model. Methods of projecting onto the surface are discussed below.

Methods to determine the offset distance are discussed above; methods to determine the offset direction are discussed above and below.

An embodiment further comprises projecting a dental model point onto a surface of the dental model by:
 identifying a tooth corresponding to the dental model point, wherein the at least two teeth comprises the tooth and wherein the dental model point is a point in, on, and/or within 0.5 mm the dental model;
 identifying a projection plane for the tooth corresponding to the dental model point; and
 translating the dental model point in a projection direction based on the projection plane such that the dental model point is on the surface of the dental model, wherein the projection direction is calculated based on the projection plane.

At times, translating in the offset direction may result in the corresponding dental model point being located somewhere unsuitable for generating an edge for the dental device, such as the inside the gingiva of the dental model. In order to generate an edge curve, the translated point may need to be projected to the surface of the dental model.

In one embodiment, a dental model point is projected onto the surface of a dental model based on an projection plane. The dental model point is defined above.

The projection direction is the direction in which the dental model point is translated to get it to a surface of the dental model plane. The projection plane is a plane used to calculate the projection direction.

In one embodiment, the projection plane is defined by a mesial point, a distal point, and the tooth long axis, as discussed below. This projection plane splits the tooth into lingual and buccal sides. A normal vector of either of these planes can be used as the projection direction, to move the corresponding dental model point to the surface of the dental model. Other vectors based on the projection plane may also be used, for example, vectors set at 30 degrees from the projection plane.

In another embodiment, the projection plane is generated from a dental arch, the offset plane, and the mesial-distal midpoint of a tooth. The dental arch is generated by fitting a third-order curve to the mesial-distal midpoints of the teeth of a jaw, by a method such as least squares regression. This results in a smooth curve that approximates the arch of the jaw, but may not pass directly through every mesial-distal midpoint. The offset plane is generated as discussed above. Then, for a given tooth, a projection direction is set to be parallel to the offset plane, and perpendicular to the dental arch at the point where the dental arch is nearest the tooth's mesial-distal midpoint. This projection direction is pointed towards the buccal surface; the projection direction opposite is to the lingual surface.

In one embodiment, the projection plane is a plane calculated from a dental model data set of mesial and distal points, and the projection direction is a normal of this plane. For a given tooth, a midpoint between a mesial point and a distal point can be projected onto the surface of the dental model, and used as a terminal tooth point, as discussed below.

An embodiment further comprises projecting a dental model point onto a surface of the dental model by:
  identifying an area of interest on the surface of the dental model; and
  identifying within the area of interest a point closest to said dental model point.

As discussed above, it may be necessary to project a dental model point onto the surface of the dental model. In one embodiment, the dental model point is projected onto the surface by identifying an area of interest on the surface, then identifying the point on said surface nearest the translated point.

An area of interest is an area on the surface of the dental model . . . . In one embodiment, the area of interest is the entire surface of the dental model; thus, the closest point would be the absolute closest point. In another embodiment, however, the area of interest may be the lingual side or the buccal side of the dental model data, ensuring that the dental model point is projected onto the desired surface. In another embodiment, the area of interested is bounded by two neighboring visible apices and two neighboring offset points; in this embodiment, identifying a smaller area of interest reduces the computational processing needed to find the surface point.

In some embodiments, the dental model is a digital three-dimensional data object expressed as a three-dimensional mesh or a point cloud. Each vertex of the three-dimensional mesh and point of the point cloud has Euclidean coordinates. These Euclidean coordinates can be used to calculate a distance from the dental model point.

In an embodiment, the minimum distance is calculated by comparing each vertex on the mesh to the dental model point and use the vertex with the minimum distance. There are a number of methods to make this search more efficient (Ericson 2004, particularly chapters 6-8).

An embodiment further comprises validating the dental model point projected to the surface by:
  identifying a surface normal of a facet containing the dental model point projected to the surface; and
  comparing a value of the surface normal to an expected range of values for surface normals.

When a dental model point is projected to the surface, it may be helpful to check that it is usable.

The dental model may be a digital scan of a physical object, such as a dental cast. Dental casts may be flawed representations of the actual teeth and gingiva of the patient, for example, when bubbles are caught between the cast and the mold. Removing these flaws can improve the quality of an edge curve.

One embodiment further comprises a validation step, where the surface normal of the surface-projected dental model point is compared to a range of expected values. The surface normal may be the normal for a nearby facet of the mesh of the dental model, or an average of normal for nearby facets. The expected range of values may be based on an anatomical feature such as the tooth long axis, and/or the projection plane or the offset plane. In an embodiment finding an offset point based on a translated tooth reference point, the expected range of values less than a predetermined value such as 89° difference from a vector perpendicular to a projection plane based on the corresponding tooth's mesial point, distal point, and tooth long axis.

The surface normal may be expected to be normal to a projection plane based on a mesial point, a distal point, and a tooth long axis. The surface normal may also be expected to be parallel to an offset plane based on mesial and distal points of a jaw. Where the surface normal is outside the expected range of values, the surface point is typically discarded as invalid, and the next surface point in the offset direction is be tried instead, until a valid surface point is found An embodiment further comprises controlling the waviness of the edge curve by: setting a first offset distance, wherein the first offset distance is an offset distance or set of offset distances corresponding to at least two offset points based on tooth reference points; and
  setting a second offset distance, wherein the second offset distance is an offset distance or set of offset distances corresponding to at least one offset point based on at least one control point.

In one embodiment, setting a first offset distance and a second offset distance controls the waviness of the edge curve. Waviness is the degree to which the edge curve curves in alternating directions. The first offset distance corresponds to at least two tooth reference points. The second offset distance corresponds to at least one control point.

In an embodiment where a control point is based on a point between offset points, setting the second offset distance to zero generates a straight edge curve when viewed from a direction parallel to the offset plane; In other directions, the edge curve may still look wavy, for example, due to the texture of the dental model's surface.

Where the second offset distance is not zero, the edge curve will be wavy when viewed from a direction parallel to the offset plane, and the magnitude of the second offset distance corresponds to the amplitude of the waves. In an embodiment where the edge curve is used on a clear aligner, a typical range for the second offset distance is 0.5 mm to 4 mm, where 0.5 mm generates a slightly wavy edge curve, and 4 mm generates a very wavy edge curve.

Conversely, in an embodiment where the control point is a point between visible apices, setting the second offset distance to zero results in a very wavy line. Setting the second offset distance to a first offset distance results in a straight line when viewed from a direction parallel to the offset plane. The second offset distance still controls the waviness of the line.

Controlling waviness is useful for adjusting the edge curve to its environment. For example, on the lingual side of a clear aligner, the edge curve may be smoother, as the surface is smoother there and it improves the comfort of the wearer by facilitating a smoother edge next to the tongue. On the buccal side however, the surface is bumpier and adding waves provides a better grip on the surface.

An embodiment further comprises:
setting a bounding box enclosing an interproximal area between two adjacent teeth; and
comparing the offset points to the bounding box to prevent said edge curve from crossing into the interproximal area.

One embodiment further comprises using a bounding box to prevent the edge curve from entering the interproximal area. A bounding box is a three-dimensional area roughly shaped like a box, used to set a boundary.

In one embodiment, a bounding box is generated based on two adjacent teeth from the dental model, a first tooth and a second tooth. The base of the bounding box is the quadrilateral defined by the first tooth's buccal visible apex, the first tooth's lingual visible apex, the second tooth's buccal visible apex, and the second tooth's lingual visible apex. The top of the bounding box is the base translated away from the gingiva, in a direction normal to the offset plane and towards the occlusal surface, by a set distance, for example, 10 to 15 mm. The sides of the bounding box are defined by connecting the top and the bottom.

Each offset point is then validated by a comparison to the bounding box. If the offset point is found to be inside the bounding box, a point outside the bounding box is in place of the original offset point. Thus, the edge curve is kept outside the interproximal area.

In an embodiment, validation may rely on the identification of visible apices. The identification of visible apices may be based on the segmentation step, which results in separating individual tooth from one another and gingiva and occurs prior to designing the staged virtual models.

An embodiment further comprises fitting the edge curve to a terminal tooth by:
identifying at least one terminal tooth point for the terminal tooth; and
fitting said edge curve through the at least one terminal tooth point.

One embodiment fits the edge curve to a terminal tooth by finding at least one terminal tooth point to fit the edge curve through. A terminal tooth includes a last tooth that the edge curve fits.

In an embodiment, the terminal tooth may be any tooth. At times, it is an end tooth of the jaw; in such case, the edge curve may fit such that the completely over the tooth or partially over the tooth. Where the edge curve fits partially over an end tooth, it may cross the margin line at the visible apex or further in a distal direction, i.e. towards the distal point of the end tooth. Where the terminal tooth is not an end tooth such as a tooth penultimate to the end tooth, the visible apex of the tooth may be included in calculating the spline on the relevant side, ensuring that the edge curve passes validation later. In such case, the edge curve is prevented from passing through the interproximal area for example the edge curve passing through the visible apex and over the terminal tooth.

Where the edge curve is partially over the terminal tooth, the edge curve may be controlled with the assistance of a terminal tooth point. A terminal tooth point is a point on the terminal tooth.

In the absence of at least one terminal tooth point, the edge curve will be fitted to the nearest offset points. However, terminal tooth points can help provide a more precise fit over the terminal tooth, allowing a dental technician to choose where the edge curve is located on the terminal tooth/teeth.

In one embodiment, a terminal tooth point can be based on a mesial-distal midpoint.

A midpoint between a mesial point and a distal point is calculated, then projected onto the occlusal surface of the tooth, by one of the methods discussed above.

In one embodiment, at least one terminal tooth point is calculated by translating at least one margin line point upward onto the terminal tooth. The at least one margin line point may be the point(s) closest to a distal point on the tooth. This is particularly useful where the terminal tooth is also an end tooth of the dental model, and the dental practitioner wishes the dental device to cover more of the terminal tooth.

An edge curve generated with the methods disclosed above can be further improved by a number of post-processing steps before being used to actually cut a dental device. Below, some useful methods are listed.

One embodiment further comprises setting a minimum curve radius for the edge curve.

A curve radius is the radius of the circular arc which best approximates the curve at that point. Many dental devices are milled, and a milling device may not be able to cut a curve that is too sharp. Setting minimum curve radius is useful in creating an edge curve that can be cut given the technical limitations of the milling device.

One embodiment further comprises removing loops from the edge curve.

The edge curve as generated may have loops, i.e. places where the edge curve intersects itself. A loop is undesirable, as it may cause difficulty milling a dental device and/or an uncomfortable fit. In one embodiment, loops are detected, removed, and smoothed.

One embodiment further comprises configuring the edge curve to set a minimum width for a dental device manufactured based on the edge curve.

Setting the minimum width can make the dental device less prone to breaking. One embodiment does this by configuring an edge curve to set this minimum width. This can be done where the dental device is cut or printed at least partially based on the edge curve.

In one embodiment, the edge curve is configured to set a minimum width for a dental device manufactured based on the edge curve, where the edge of dental device dental device may be for example, completely or partially defined by an edge curve. Where at least one edge curve defines the both lingual and buccal sides of a dental device, the offset points may be divided into lingual and buccal offset points.

Euclidean distances may be calculated, for example, between each lingual point and each buccal point. Where the Euclidean distance is below a minimum distance, a new offset point is calculated for each of the offset point below a minimum distance, by one of the methods discussed above. Each new offset point's offset distance is half of the difference between the Euclidean distance and the minimum threshold, and the new offset point's offset direction is outwards from the line between the pair of points. The edge curve is then fit according to the new offset points, ensuring a minimum width.

One embodiment further comprises manual adjustment of the edge curve.

In one embodiment, a technician may be dissatisfied with the automatically generated edge curve, and choose to adjust the offset points, tooth terminal points, and or the curve itself manually. The dental technician may makes these changes through a software program. The edge curve is then adjusted to include these changes.

An embodiment further comprises modifying the edge curve in response to a user input.

In an embodiment, the edge curve may be modified in response to user input, allowing users to make changes and/or corrections to an edge curve. This allows for human oversight of machine-generated edge curve, as well as for users to edit their own work.

An embodiment further comprises:
selecting a first point on the edge curve;
selecting a second point on the edge curve;
identifying an original curve section of the edge curve based on the first point and the second point;
generating a modified curve section by rendering a line between the first point and the second point in response to user input; and
replacing the original curve section with a modified curve section.

In an embodiment, an edge curve may be modified in a single curve section. This allows for the correction of local problems, e.g. modifying an edge curve around a protuberance in gingiva to make a clear aligner more comfortable for the patient; correcting an obvious machine-generated error in an otherwise acceptable curve.

A first point and a second point on the edge curve may be chosen, an original curve section may be identified based off the first and second point. For example, the original curve section may be the section of the edge curve between the first point and the second point.

A modified curve section may then be generated by rendering a new line between the first point and the second point. The modified curve section may be generated in response to user input.

The user input may include one or more of a manually drawn line, different from the original curve section, in between the first point and the second point with a drawing tool, or moving a point on the curve and adjusting the curve around the moved curve, or marking at least one point proximal to the original curve section. Details of some of these embodiments are described below.

Finally, the modified curve section replaces the original curve section, resulting in a modified curve.

An embodiment further comprises wherein user input comprises manual rendering. This may include providing input for a modified curve section such as a line representing an approximate modified curve section either between or proximal to the first point and second point.

In an embodiment, the modified curve section may be generated based on manual rendering by the user. This allows a fast and familiar way for users to modify the edge curve.

A new line drawn by the user may be input, for example, using a drawing tool such as a mouse, touch pad, or stylus. The first point and the second point here may be derived from the end points of the user's line, or the intersection of the user's line and the original edge curve. Where the line drawn by the user does not intersect with the original edge curve, the nearest point on the original edge curve may be used as the first or the second point.

This embodiment may further comprise post/processing to clean up the user's drawing, including but not limited to detection and removal and extraneous parts of the line, and/or smoothing of curves.

A method of any one or more of the preceding claims, further comprising generating a modified curve section by:
identifying at least one primary curve point on the original curve section;
moving the at least one primary curve point; and
generating the modified curve section based on the moved at least one primary curve point.

In an embodiment, the user input for a modified curve section may be based on moving a point on the curve, and the modified curve section may be based on the movement of that point.

First, a primary curve point is found. This is a point on a curve and may be, for example, a control point, a tooth reference point, a point based on the prior points, or any other point on the curve. Next, the primary curve point is moved. This may be done, for example, with user input, and/or by a pre-determined distance and direction. User-input may come from, for example, a user moving the primary curve point itself, or by finding a user-input point, as described below.

A modified curve section may be calculated based on the moved primary curve point. This may be done in a similar manner to fitting the edge curve above, e.g. by fitting a spline through the moved points and the first and the second points.

A method of any one or more of the preceding claims further comprising:
obtaining a user-input point; and
selecting as the primary curve point a curve point of the original curve section closest to the user-input point.

In some embodiments, user input may be based on a user-input point, such as a point that a user selects near the curve. In an embodiment, a user selects a user-input point, such as a nearby pixel on a screen, and the primary curve point is the point nearest the user input point, e.g. with the shortest Euclidean distance between the points. This allows the user to move the curve without precisely selecting a point on the curve, and may be particularly useful where the input device is a computer mouse, and a user can click a point near the curve without worrying over much about the accuracy of their click.

An embodiment further comprises:
generating a modified curve section; and
displaying the modified curve section.

In an embodiment, the modified curve section is displayed, e.g. on a screen or another device. Such display on the screen may be provided as a preview of the possible change in the edge curve. This allows a user to see what a change to an curve would be like before actually changing it. This further permits the user to make changes that still comply with the validation procedures as described above.

An embodiment further comprises displaying the modified curve section and the original curve section simultaneously. This allows an immediate visual comparison of the original curve and the modified curve. The display may be made by showing only the curve sections or curve sections along with rest of the edge curve.

An embodiment further comprises displaying the modified curve section and the original curve section over a related 3D model.

An embodiment further comprises displaying both the original curve section and the modified curve section over a related 3D model, e.g. a digital dental model representing oral condition of the patient. This allows modifications to be made with the context in mind; for example, in a dental situation, this allows the modifications to consider the anatomy and other condition e.g. gingival health of the patient.

An embodiment further comprises displaying the modified curve section and the original curve section with different transparencies. Displaying the modified curve section and the original curve section at different transparencies allows the user to more easily distinguish them. For example, the modified curve may be presented to be more transparent to emphasize its temporary character. The user may be provided with User Interface controls such as a slider to control (increase or decrease) the transparency of the curve sections. The slider may include individual sliders corresponding to each curve section or a single slider that controls transparency ratio between the two curves or controls transparency of one curve and transparency of other curve is adjusted by applying a predefined ratio to the transparency selected based on controlling the slider.

An embodiment further comprises displaying the modified curve section and the original curve section in different colors.

Displaying the modified curve section and the original curve section at different colors allows the user to more easily distinguish them. For example, the original curve section may be displayed as the same color as the original curve, while the modified curve section may be displayed in a different color to emphasize that it is a potential change.

An embodiment further comprises iteratively updating the display by:
moving the at least one primary curve point;
calculating a modified curve section based on the moved at least one primary curve point; and
displaying the modified curve section.

The modified curve section may be calculated and displayed dynamically, such that a user can see a number of potential changes, and adjust the primary curve point accordingly. This allows the user to quickly adjust the curve to meet their needs. This is accomplished by updated the modified curve section each time to user moves the at least one primary curve point.

An embodiment further comprises:
retaining a previous curve section; and
reverting to the previous curve section by replacing the modified curve section with the previous curve section, the previous curve section comprising the original curve section of the edge curve or a modified curve section prior to the replaced modified curve section.

By retaining the previous curve section, a user may be able to quickly undo an unwanted change, e.g. by clicking "undo", and/or "Ctrl+z" on a keyboard. Multiple previous curve sections may be retained, allowing the user to revert back to previous versions of the curve.

An embodiment further comprises identifying a visible apex from a limited part of an oral situation, tooth, gingiva and/or margin line.

In an embodiment, a visible apex may be selected from a limited part of an oral situation, tooth, gingiva, and/or margin line. The limited part may be confined to the center of the lingual or buccal side of the tooth. This may allow better control over the edge curve by increasing the likelihood that the visible apices occur at more regular intervals, and may also increase the likelihood that the visible apices and their corresponding control points better reflect the anatomy of the patient.

This may also make manufacturing easier, by reducing the likelihood of parts of the curve that are too difficult to cut. For example, if a visible apex were previously to be found too close to or on the mesial side of a tooth, combined with an offset point and/or the visible apex of a neighboring tooth, it may have made a sharp turn that may have been both difficult to manufacture and increased patient discomfort. The limited part may prevent such a situation from occurring.

An embodiment further comprises identifying the limited part by:
identifying a mesial-distal axis;
identifying a tooth long axis for the tooth;
identifying a lingual-buccal axis based on an orthogonal of the tooth long axis and the mesial distal axis; and
identifying the limited part by generating at least one limitation of an oral situation, tooth, gingiva, and/or margin line based on the lingual-buccal axis.

An embodiment identifies a limited part based on a lingual-buccal axis, which may be used to help generate boundaries to define the limited part.

First, a mesial-distal axis is identified based on a mesial point and a distal point. The mesial-distal axis may be an axis passing through both a mesial point and a distal point. A tooth long axis is also identified, the tooth axis is typically perpendicular to the mesial distal axis and usually runs along the height of the tooth crown.

Next, a lingual-buccal axis is identified. The lingual-buccal axis may be an orthogonal of the mesial-distal axis and the tooth long axis, and may be found, for example, by calculating their cross-product.

Next, a limitation may be generated based on the lingual-buccal axis. A limitation may be used to help bound of define a limited part, as discussed in further detail below. This limitation may apply to the oral situation, the tooth, the gingiva, and/or the margin line.

An embodiment further comprises defining a limited part by:
generating a first limitation plane based on a first rotated lingual-buccal axis along the tooth long axis;
generating a second limitation plane based on a second rotated lingual-buccal axis along the tooth long axis;
defining the limited part based on a length, area, and/or volume between the first and the second limitation planes.

In an embodiment, the limited part is defined based on rotating the tooth long axis.

First, a first rotated lingual-buccal axis is generated, for example, by rotating the lingual-buccal axis between a selected range between 1 and 90 degrees clockwise around the tooth long axis. This is then translated along the tooth long axis, generating a first limitation plane.

Next, a first rotated lingual-buccal axis is generated, for example, by rotating the lingual-buccal axis between a selected range between 1 and 90 degrees counter-clockwise around the tooth long axis. This is then translated along the tooth long axis, generating a second limitation plane.

The first and second limitation planes may then be used to define the limited part, which may be a length, area, and/volume. The dimensionality of the limited part may depend on the dimensionality of the underlying model. For example, for the margin line, the limited part may be the length of margin line between the first limitation plane and the second limitation plane. For the surface of the oral situation, the limited part may be the area between the first limitation plane and the second limitation plane. For the 3D model, the limited part may be the volume between the limitation planes.

An embodiment further comprises defining a limited part by:
- generating a first limitation plane based on a first translated lingual-buccal axis and parallel to a tooth long axis;
- generating a second limitation plane based on a second translated lingual-buccal axis and parallel to a tooth long axis; and
- defining the limited part based on a length, area, and/or volume between the first and the second limitation planes.

First, a first translated lingual-buccal axis is generated, for example, by translating an axis parallel to the lingual-buccal axis by a fixed distance (e.g. 0.01 mm to 3 mm) or a relative distance (e.g. 50% of the distance between the tooth long axis and a mesial point) in the direction of the mesial point. The first translated axis may then be used to generate a first limitation plane, for example, a plane parallel to the plane intersecting the lingual-buccal axis and the tooth long axis and passing through the first translated axis.

Next, a second translated lingual-buccal axis is generated, for example, by translating an axis parallel to the lingual-buccal axis by a fixed distance (e.g. 0.01 mm to 3 mm) or a relative distance (e.g. 50% of the distance between the tooth long axis and a distal point) in the direction of the distal point. The second translated axis may then be used to generate a second limitation plane, for example, a plane parallel to the plane intersecting the lingual-buccal axis and the tooth long axis and passing through the second translated axis.

The first and second limitation planes may then be used to define the limited part, which may be a length, area, and/volume. The dimensionality of the limited part may depend on the dimensionality of the underlying model. For example, for the margin line, the limited part may be the length of margin line between the first limitation plane and the second limitation plane. For the surface of the oral situation, the limited part may be the area between the first limitation plane and the second limitation plane. For the 3D model, the limited part may be the volume between the limitation planes.

An embodiment further comprises identifying a visible apex from a limited part based on a bounding box.

A limited part may also be generated based on a bounding box, for example, generating a bounding box based on a rectangular prism or cylinder centered around the intersection of the mesial-distal axis, the tooth long axis, and the lingual-buccal axis.

One embodiment further comprises generating a digital data format suitable for manufacturing a physical object based on said edge curve.

After an edge curve has been generated, it may need to be converted to a digital format that allows a physical object to be manufactured, for example, by cutting an existing physical object or by defining the edge of a three-dimensional printed object. In one embodiment, random points along the edge curve are sampled, and the Euclidean coordinates are calculated based on the edge curve.

The edge curve is usually a spline. As a spline is a collection of functions, it may often be stored as a matrix. A given point on the spline may be calculated, rather than stored as a point in three-dimensional space. To put the edge curve in a digital format suitable for cutting, the edge curve is sampled at intervals. Intervals of 0.1 mm to 1 mm, preferably 0.3 mm, are used, providing sufficient guidance for a milling machine or printer while allowing for calculations in a reasonable time. For each sample, the nearest point on the surface of the dental model is found. The nearest points are then stored as a polyline, a collection of points connecting into a line, and this is used to guide the cutting or printing of the dental device.

One embodiment further comprises wherein said dental device be generated with the edge curve, wherein said dental device may be from a list comprising: an aligner, a mouthguard, a splint, an indirect bonding tray, and/or any portion thereof.

In one embodiment, a generated edge curve is used to generate a dental device, for example, a 3D-printed device such as an indirect bonding tray or a printed aligner. The edge curve is projected from the dental model to a related dental device. In an embodiment with a printed aligner, an edge of the aligner being designed may be based on the edge curve, whether using the edge curve directly, or further processing it to meet technical criteria for 3D printing, such as minimum thicknesses or avoiding steep overhangs.

According to an embodiment, a data processing system is disclosed. The data processing system includes modules/units such as a hardware processor that are configured to perform one or more steps of the method disclosed in one or more embodiments of this disclosure.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor.

The method may include one or more functions that allow one or more system modules/units to perform one or more steps of the method disclosed in one or more embodiments of this disclosure.

LIST OF ITEMS

A method according to one or more of the preceding items, further comprising setting a minimum curve radius for the edge curve.

A method according to one or more of the preceding items, further comprising removing loops from the edge curve.

A method according to one or more of the preceding items, further comprising configuring the edge curve to set a minimum width for a dental device manufactured based on the edge curve.

A method according to one or more of the preceding items, further comprising manual adjustment of the edge curve.

BRIEF DESCRIPTION OF THE DRAWINGS

The above and/or additional objects, features and advantages of the present disclosure, will be further described by the following illustrative and non-limiting detailed description of embodiments of the present disclosure, with reference to the appended drawing(s), wherein:

FIG. 4A shows a dental model of a lower jaw, a three-dimensional mesh according to an embodiment;

FIG. 4B shows a close-up of the dental model in FIG. 4A, a three-dimensional mesh according to an embodiment;

FIG. 15A shows an embodiment of a tooth and relevant axes;

FIG. 15B shows an embodiment with a limited part based on a rotated lingual-buccal axis; and FIG. 15C shows an embodiment with a limited part based on a translated lingual-buccal axis.

DETAILED DESCRIPTION

In the following description, reference is made to the accompanying figures, which show by way of illustration how the disclosure may be practiced.

Although some embodiments have been described and shown in detail, the disclosure is not restricted to them, but may also be embodied in other ways within the scope of the subject matter defined in the following claims. In particular, it is to be understood that other embodiments may be utilized and structural and functional modifications may be made without departing from the scope of the present disclosure.

In device claims enumerating several units, several of these units can be embodied by one and the same item. The mere fact that certain measures are recited in mutually different dependent claims or described in different embodiments does not indicate that a combination of these measures cannot be used to advantage.

A claim may refer to a method according to one or more of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It needs to be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

Figure 1:
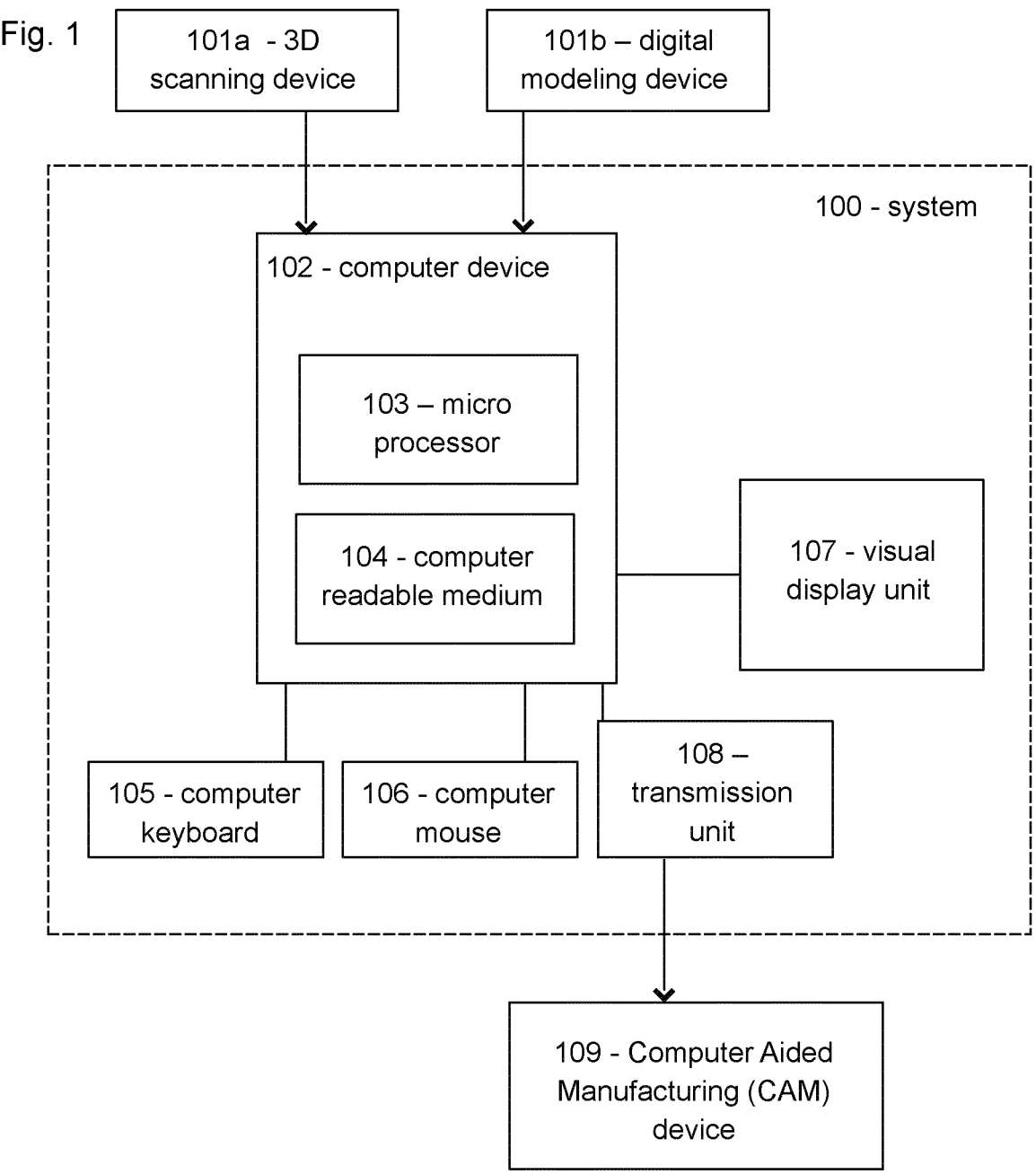
FIG. 1 shows a schematic of a system according to an embodiment of the disclosure.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of obtaining generated three-dimensional dental models from a digital modelling device 101*b*, that may be used as dental models. The obtained a generated three-dimensional dental models can be stored in the computer readable medium 104 and provided to the processor 103.

Additionally or alternatively, the computer device 102 is further capable of receiving a digital 3D representation, for example, of the surfaces of the patient's set of teeth and gingiva from an image acquisition device 101*a*, for example a 3D scanning device, such as the TRIOS intra-oral scanner manufactured by 3 shape TRIOS A/S, or capable of receiving scan data from such a 3D scanning device and forming a digital 3D representation of the patient's set of teeth and/or gingiva based on such scan data. The received or formed digital 3D representation can be stored in the computer readable medium 104 and provided to the microprocessor 103.

The system 100 is configured to allow an operator to design an edge curve for a dental device using information obtained from a scan. This can be realized, for example, by displaying a dental model on the visual display unit 107, and the operator can then visualize his/her edge curve design on the visual display unit.

The system comprises a unit 108 for transmitting the edge curve in a digital data format suitable for manufacture to a fabrication machine for generating a dental device to e.g. a computer aided manufacturing (CAM) device 109 or to another computer system e.g. located at a milling or printing center where the customized dental restorations are manufactured. The unit for transmitting can be a wired or a wireless connection, and the transmission may be done for example using the internet or File Transfer Protocol (FTP).

The scanning for a dental model using the 3D scanning device 101*a* and/or the modelling for a dental model using the digital modelling device 101*b* may be performed at a dentist, while the dental device design may be performed at a dental laboratory. In such cases the dental model can be provided via an internet connection between the dentist and the dental laboratory.

The system 100 as shown is an illustrative example. For example, the computer device 102 may comprise more than one micro processor 103 and/or more than one computer readable medium 104, the visual display unit 107 may be integrated in the computer device 102 or be separate from the computer device 102, etc.

Figure 2:
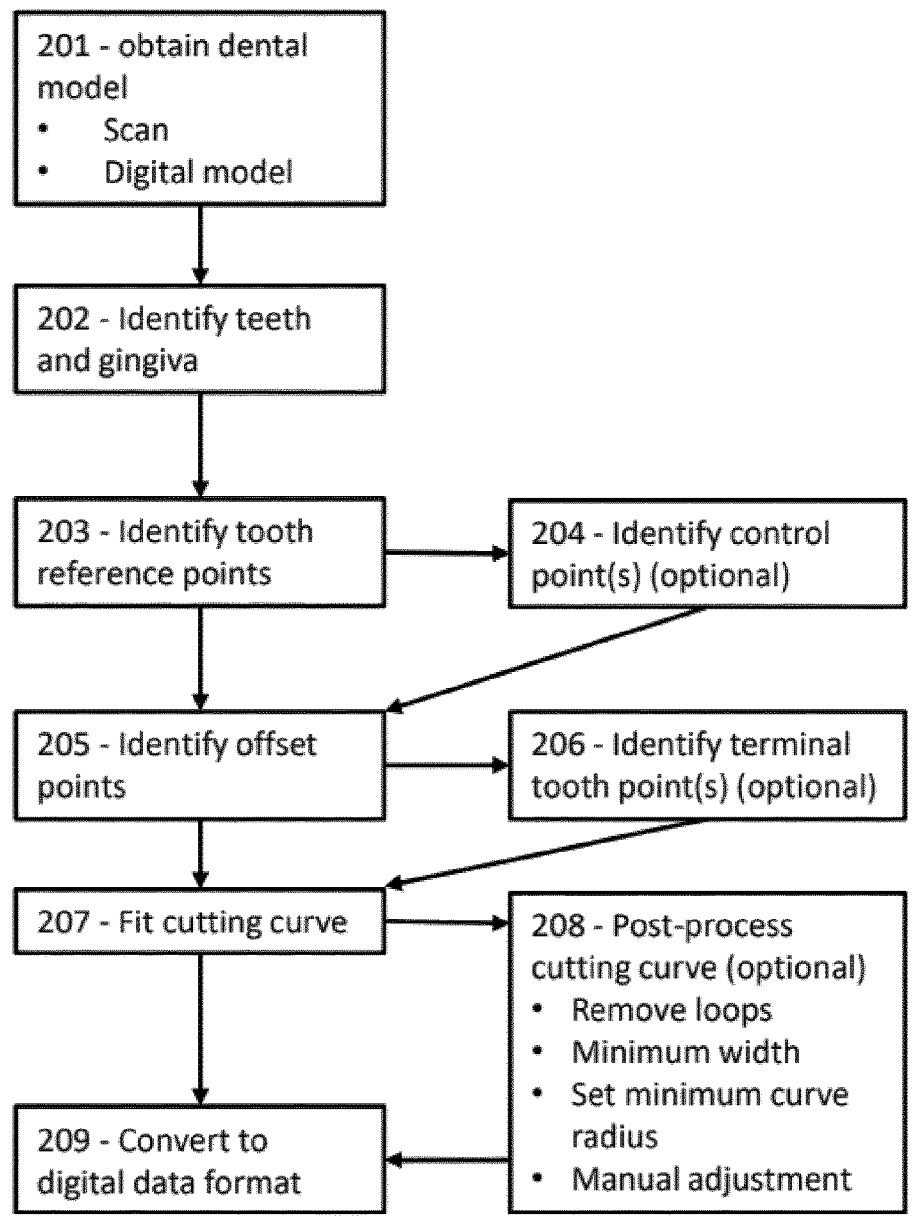
FIG. 2 shows a flowchart of a method of generating an edge curve for a dental device according to an embodiment.

FIG. 2 shows a flowchart of a method of generating an edge curve for a dental device.

In step 201, the dental model is obtained. As discussed above, the dental model may be a three-dimensional scan or a digital model, although it is not limited to these embodiments. A three-dimensional scan may be made from an cast of a patient's teeth, or directly from the patient. A digital model may originate from a scan, but has been modified in some way, for example, the teeth have been moved to be the next step in an orthodontic treatment plan, or brackets have been added to simulate a tray for indirect bonding.

Step 202 segments the teeth and gingiva. Some discussion of mesh segmentation may be found in Shamir, 2008. Tooth segmentation divides the scan into tooth and gingiva, as well as separating individual teeth.

Step 203 identifies tooth reference points, as discussed above.

Step 204 identifies at least one control point, as discussed above. An edge curve can be generated from offset points from tooth reference points alone. However, identifying control points allows for more control over the edge curve, for example, in controlling the waviness of the edge curve.

Step 205 identifies offset points, based on the tooth reference points and any control points, if there are control points. Identifying offset points means displacing the tooth reference points and/or control points by an offset distance in an offset direction. This may be done by one of the methods discussed above. By controlling the offset distance for different groups of offset points, the edge curve may be tailored to the specific situation, as discussed below and above. An edge curve can be made smoother or wavier, for the situation, or given a bit more coverage where necessary. See FIG. 12A-C for examples of such tailoring.

Step 206 identifies at least one terminal tooth point, as discussed above. Using at least one terminal tooth point in addition to the offset points may allow for a more precise fit than using offset points alone. Methods for identifying terminal tooth points are discussed above, and below, particular in FIG. 9.

Step 207 fits the edge curve to the offset points and, if they exist, any terminal tooth points. The methods for fitting this curve are discussed above.

Step 208 post-processes the edge curve. Postprocessing the edge curve can offer more customization and make manufacturing easier. This includes removing loops, setting minimum widths, setting minimum curve radii, and manual adjustment of the edge curve, as discussed above.

Step 209 converts the edge curve to a digital data format suitable for manufacture, in a method discussed above.

Figure 3:
FIG. 3 shows an example of an edge curve according to an embodiment.

FIG. 3 shows an example of an edge curve. Here, the edge curve has been generated for the lower jaw. The first offset distance and second offset distance are different for the buccal segment, as can be seen by the waviness of the line there. For the lingual segment, the line is smoother, as the offset distances are more similar. The terminal teeth have been fitted over by using distal points, as discussed above.

Figure 4A:
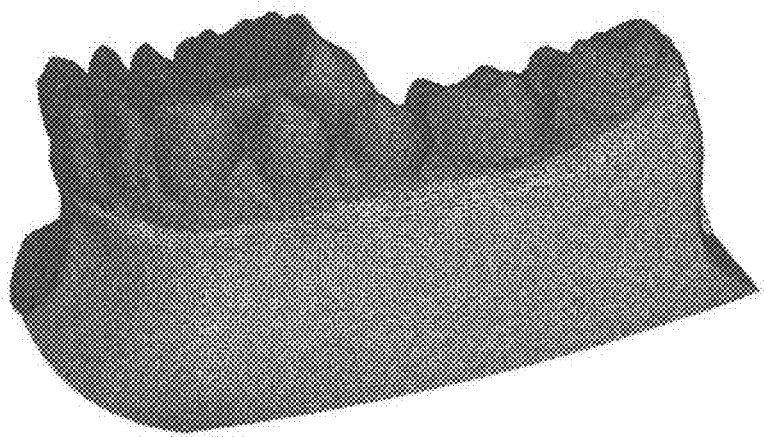
FIG. 4A-B shows a two views of a dental model, a three-dimensional mesh according to an embodiment.
Figure 4B:
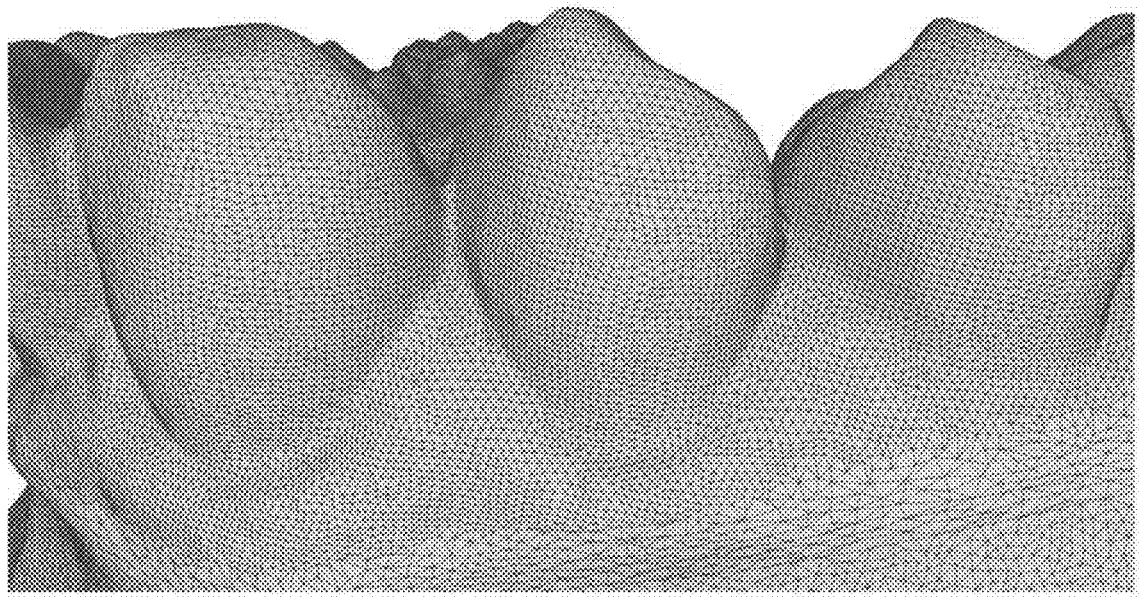

FIG. 4A-B shows a two views of a dental model, a three-dimensional mesh.

FIG. 4A shows an example of a dental model, a three-dimensional mesh from a scan of a lower jaw.

FIG. 4B shows a close-up of the dental model that better displays the triangular mesh format.

Figure 5:
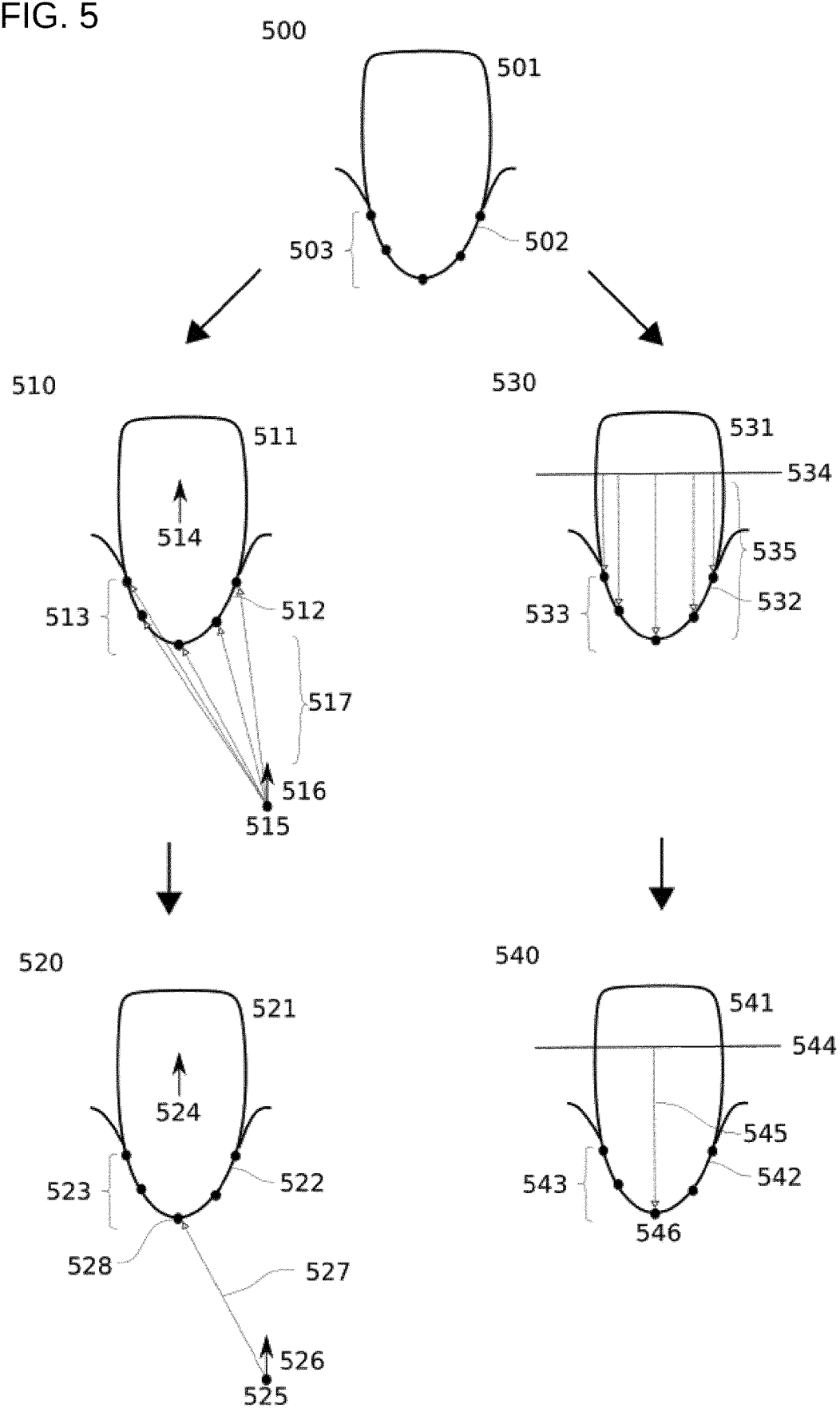
FIG. 5 shows two methods of finding a visible apex from a set of margin line points according to an embodiment.

FIG. 5 shows two methods of finding a visible apex from a set of margin line points.

Step 500 shows tooth 501 in the dental model, with margin line 502 and margin lines points 503.

Steps 510 and 520 show an embodiment where a visible apex is identified as the margin line point with the minimum dot product from its location vector and the tooth long axis unit vector. Here, the reference is the tooth long axis unit vector based at the origin, the measurement is the dot product of the tooth long axis unit vector and a margin point's location vector, and the optimal measurement is the minimum dot product.

Step 510 shows the tooth 511 has margin line 512 and margin lines points 513. Tooth long axis 514 has a direction and location; Tooth long axis unit vector 516 has the same direction, but is of a unit length, for example 1 mm, and starts at origin 515. The origin 515 is the origin of the Euclidean space of the dental model; in a three-dimensional Euclidean space, the origin has coordinates (0,0,0). Location vectors 517 are the vectors representing the location of the margin line points 513 relative to the origin 515.

Vectors in Euclidean space, including location vectors 517 and tooth long axis unit vector 516, can be represented as matrices. The dot product of two of these matrices is proportional to the distance between the two points. Thus, the dot product of one location vector of the location vectors 517 and the tooth long axis unit vector 516 is proportional to the distance between them. The minimum dot product is proportional to the minimum distance, and thus can be used as an optimal measurement as described above.

Step 520 shows the visible apex 528, selected from the margin line points 523, because it has the minimum dot product of its location vector 527 and the tooth long axis unit vector 526. The tooth 521 has margin line 522, margin lines points 523, tooth long axis 524, and is found in a Euclidean space with origin 525.

Steps 530 and 540 show an embodiment where a visible apex is identified as the margin line point with the maximum distance from a reference plane. Here, the reference is a reference plane generated from mesial and distal points, the measurement is the distance from the reference plane (as represented by the distance vector), and the optimal measurement is a maximum distance.

Step 530 shows the tooth 531 with margin line 532 and margin line points 533. Each vector of distance vectors 535 has a magnitude that reflects its distance from reference plane 534. Reference plane 534 is a plane roughly parallel to the occlusal plane; here, for example, the reference plane may be based on a plane found from the mesial-distal points as described below.

Each of distance vectors 535 is the shortest vector from the reference plane 534 to each of margin line points 533, and their magnitudes reflects the shortest distance between the reference plane and each margin line point.

Step 540 shows tooth 541 with margin line 542 and margin line points 543. A visible apex 546 is identified as the margin line point farthest from the reference plane 544, as visible apex 546 has the longest distance vector 545.

Figure 6:
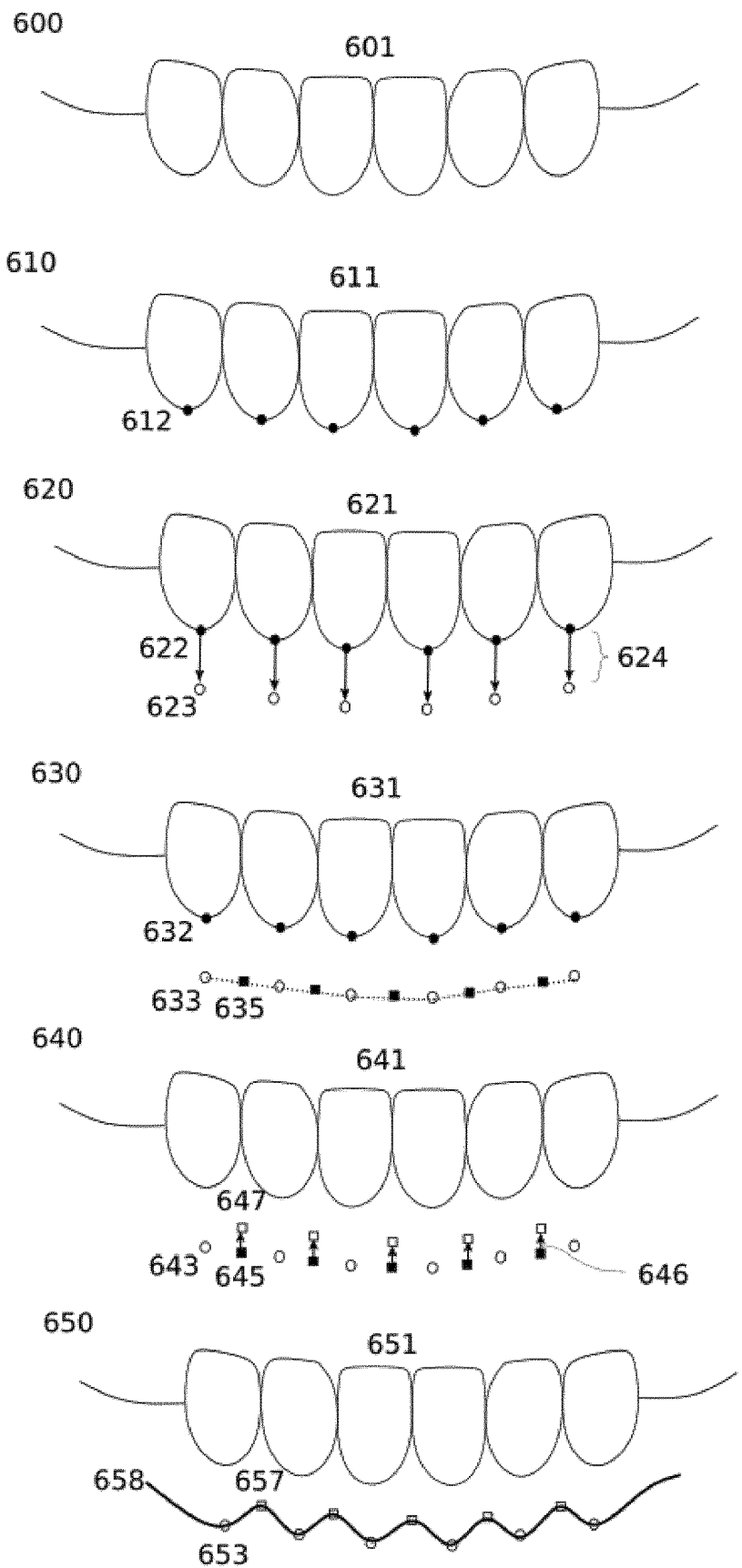
FIG. 6 shows a method of generating an edge curve with offset points for a set of teeth according to an embodiment.

FIG. 6 shows a method of generating an edge curve with offset points for a set of teeth. Note that some components are omitted from subsequent illustrations, for clarity. However, these components continue to exist and may be used in further embodiments.

Further, as this is a schematic figure meant to illustrate an embodiment of the disclosure, and the offset distances may be exaggerated for clarity. As discussed above, the first offset distance may be as little as $10^{-18}$ mm.

Step 600 shows the dental model 601, comprising teeth 27 to 32 (universal numbering system), from the buccal view.

Step 610 identifies a set of tooth reference points 612 on the dental model 611. Here, the tooth reference points are visible apices here, found by the method described above.

Step 620 identifies a set of offset points 623 (white dots) corresponding to the tooth reference points 622 (black dots) on dental model 621. The offset points 623 have been displaced based the first offset distance and the first offset direction, represented by first offset vectors 624 (arrows), as discussed above.

Step 630 identifies a set of control points 635 (black squares) on the dental model 631. In this embodiment, the control points 635 are midpoints between adjacent offset points from the set of tooth reference points 632 (black dots). The offset points for the tooth reference points 633 are also in this diagram.

Step 640 identifies a set of offset points 647 (white squares) corresponding to the control points 645 (black squares). The offset points for the control points 645 have been displaced based on a second offset distance in a second offset direction, represented by second offset vectors 646 (arrows), as discussed above.

In this example, the first offset direction and the second offset direction are opposites, though they need not be. In this embodiment, the second offset distance is more than zero, generating a wavy edge curve. In some embodiments, the second offset distance may be zero, generating a straighter edge curve, as discussed above. This step also depicts the dental model 641 and the offset points for the tooth reference points 643 (white dots).

Step 650 fits an edge curve 658 to the offset points for the tooth reference points 653 (white dots) and the offset points for the control points 655 (white squares).

FIG. 7A-D shows regions from which the at least one control point can be found, and examples of control points.

Figure 7A:
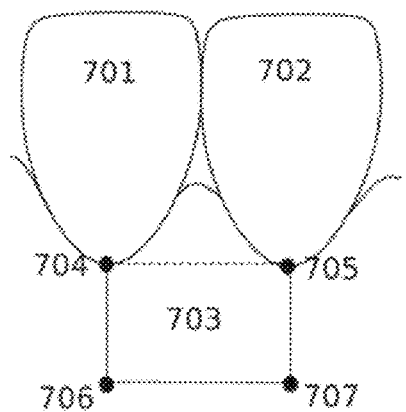
FIG. 7A-D shows regions from which the at least one control point can be found, and examples of control points according to an embodiment.

FIG. 7A shows the region 703 demarcated by tooth reference points 704 and 705 and offset points 706 and 707. Visible apex 704 and offset point 706 are based on tooth 701. Visible apex 705 and offset point 707 are based on tooth 702. One or more control points may be selected from region 703. Offset points may be inside or outside this region, but not in the interproximal area, as discussed above.

Figure 7B:
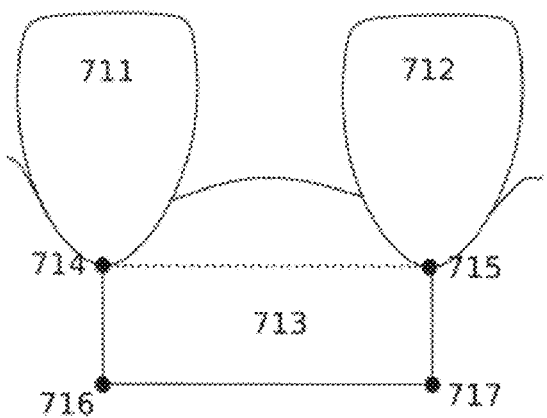

FIG. 7B shows the region 713 demarcated by tooth reference points 714 and 715 and offset points 717 and 718. Tooth reference point 714 and offset point 717 are based on tooth 711. Tooth reference point 715 and offset point 719 are based on tooth 712. One or more control points may be selected from region 713. Offset points may be inside or outside this region, but not in the interproximal area, as discussed above.

Figure 7C:
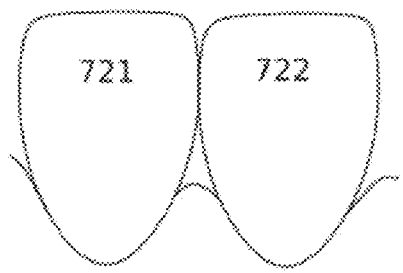

FIG. 7C shows an example of a control point selected from the region defined in 7A. Control point 728 is a midpoint of a line between offset points 726 and 727.

Figure 7D:
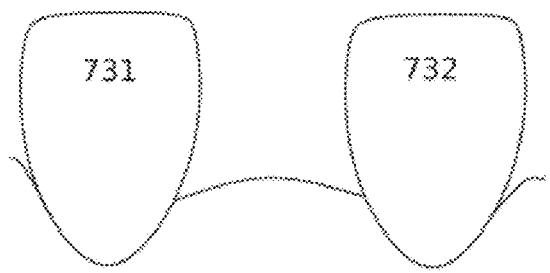

FIG. 7D shows an example of control points selected from the region defined in 7B. Control points 738 and 739 are between offset points 736 and 737. Teeth 731 and 732 have a gap between them, so having more than one control point, as illustrated, allows the edge curve to be manipulated more precisely.

Figure 8:
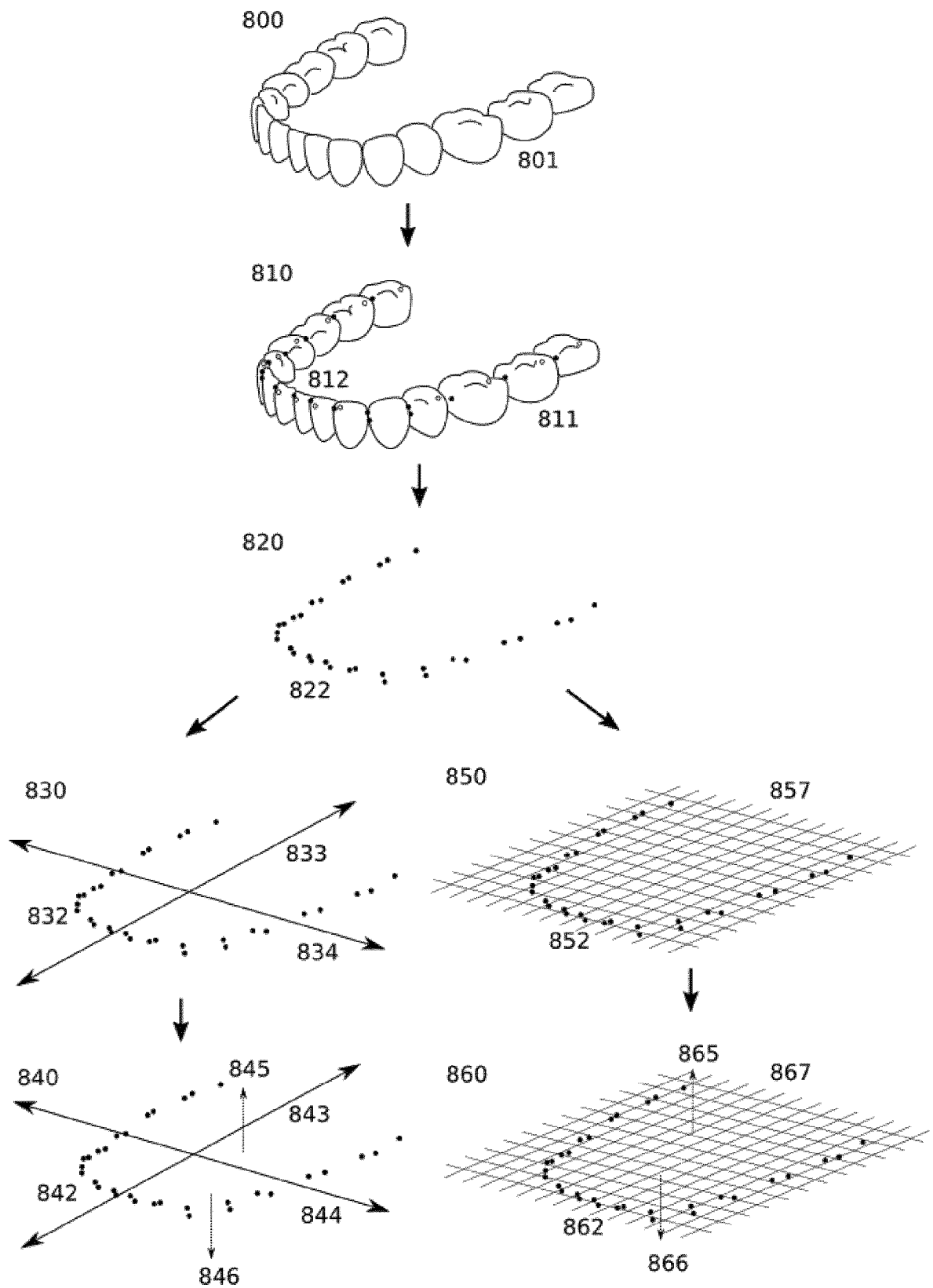
FIG. 8 shows two methods of finding an offset direction according to an embodiment.

FIG. 8 shows two methods of finding an offset direction.

Step 800 shows the dental model 801, dentition from a lower jaw.

Step 810 shows obtaining a set of dental model data 812 based on dental model 811. The dental model data set 812 is comprised of the mesial and distal points for each tooth in dental model 811. The mesial and distal points may be identified by a user or automatically identified.

Step 820 shows the dental model data 822, isolated from the dental model. Each of the points of dental model data 822 has a three-dimensional value for its location. There are several methods of identifying an offset direction from dental model data, as discussed above. Steps 830 and 840 demonstrate a principle component analysis method, and Steps 850 and 860 demonstrate a linear regression method.

Step 830 shows an offset plane derived from a principle component analysis. As discussed above, a principle component analysis was performed on the dental model data 832. The principle component analysis identifies principle components, which can be represented as axes. The first principle component axis 833 and the second principle component axis 834 define an offset plane.

Step 840 show offset direction vectors 845 and 846. Both offset direction vectors 845 and 846 are normal to the offset plane defined by the first principle component axis 843 and the second principle component axis 844. Often, the offset direction points away from the occlusal surface, and the offset direction vectors here do so. The direction of offset direction vector 845 may be used as an offset direction on the upper jaw, while the direction of direction vector 846 may be used on the lower jaw. The offset distance is set by other means, as discussed above. This illustration also depicts dental model data 842.

Step 850 shows an offset plane 857 derived from linear regression. As discussed above, linear regression was performed on dental model data 852, resulting in the offset plane 857 approximating the data.

Step 860 shows two offset direction vectors, offset direction vectors 865 and 866. Both offset direction vectors 865 and 866 are normal to the offset plane 867, and are may be used like offset direction vectors 845 and 846.

Figure 9:
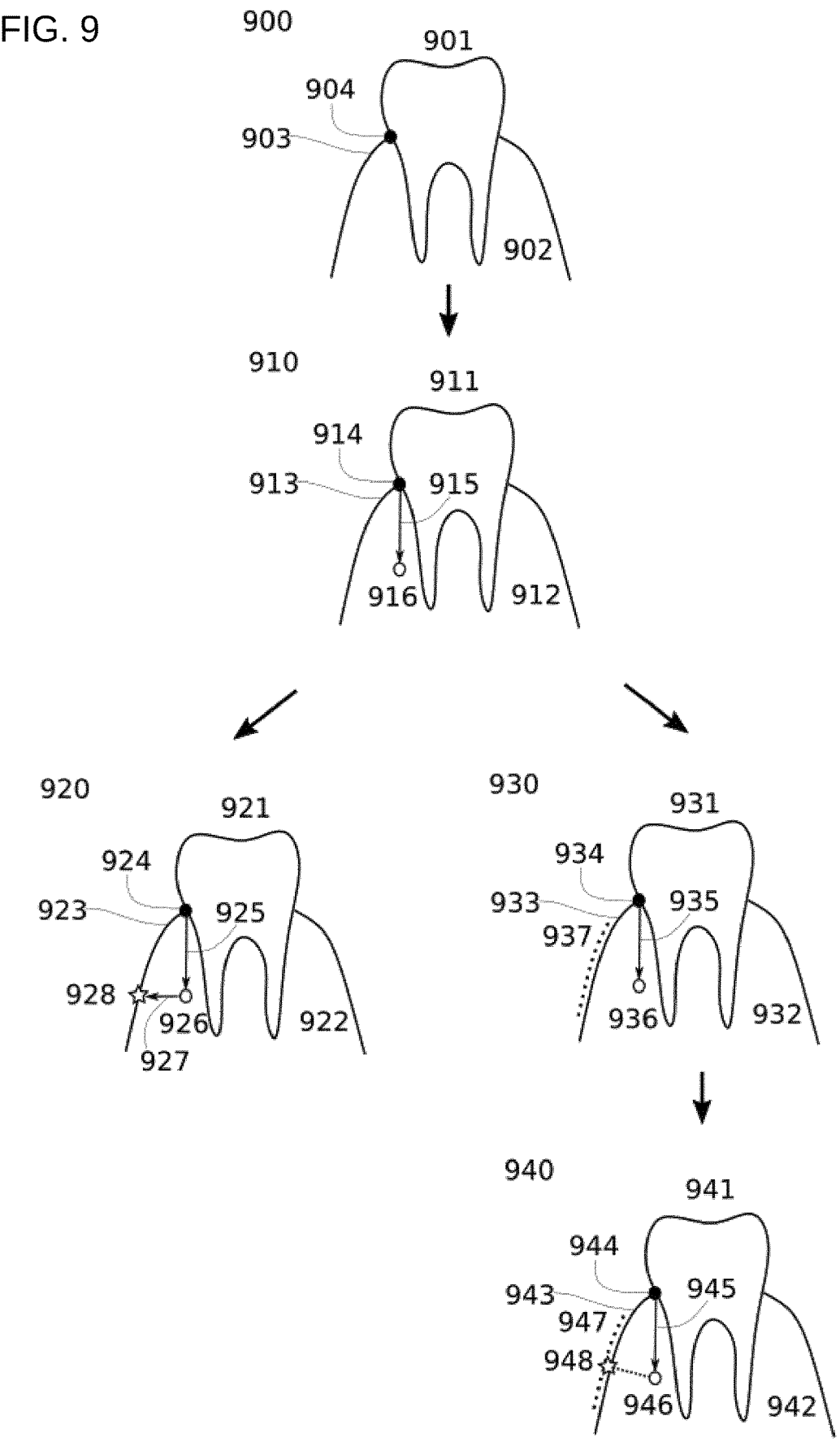
FIG. 9 shows two methods of projecting a dental model data point to the surface according to an embodiment.

FIG. 9 shows a method of finding the offset points, with two methods of projecting a dental model data point to the surface.

Step 900 shows tooth 901, gingiva 902, buccal gingival surface 903, and tooth reference point 904. Tooth reference point 904 is a visible apex on the buccal side of tooth 901.

Step 910 shows tooth 911 and translated tooth reference point 916. Translated tooth reference point 916 is tooth reference point 914 translated in the offset direction by the offset distance, with the translation represented by offset vector 915. Translated tooth reference point 913 is inside the gingiva 912, and is projected back onto the buccal gingival surface 913. There are several methods to project a dental model point on to the surface, as discussed above. Here, step 930 use a projection direction, while steps 940 and 950 use the nearest point on the correct surface.

Step 920 projects a dental model point to the surface by using a projection direction. The tooth 921, gingiva 922, buccal gingival surface 923, tooth reference point 924, and offset vector 925 are also shown. The translated tooth reference point 926 is translated again, this time in the projection direction represented by projection vector 927, until it reaches the surface at offset point 928. The projection direction points to the buccal surface, and is identified by a method discussed above and below.

Step 930 and 940 project a dental model point to the surface by finding the nearest point on the surface.

Step 930 selects an area of interest 937. This may be done, for example, by user input or by automatic selection, and ensures that the translated tooth reference point 936 comes out on the buccal gingival surface 933. The tooth 931, gingiva 932, tooth reference point 934, and offset vector 935 are also shown.

Step 940 identifies the nearest surface point, offset point 948, by one of the methods discussed above. The vertices of the mesh in the area of interest 947 are compared to translated tooth reference point 946, and the vertex with the minimum distance is identified as offset point 948. The tooth 941, gingiva 942, buccal gingival surface 943, tooth reference point 944, and offset vector 945 are also shown.

Figure 10:
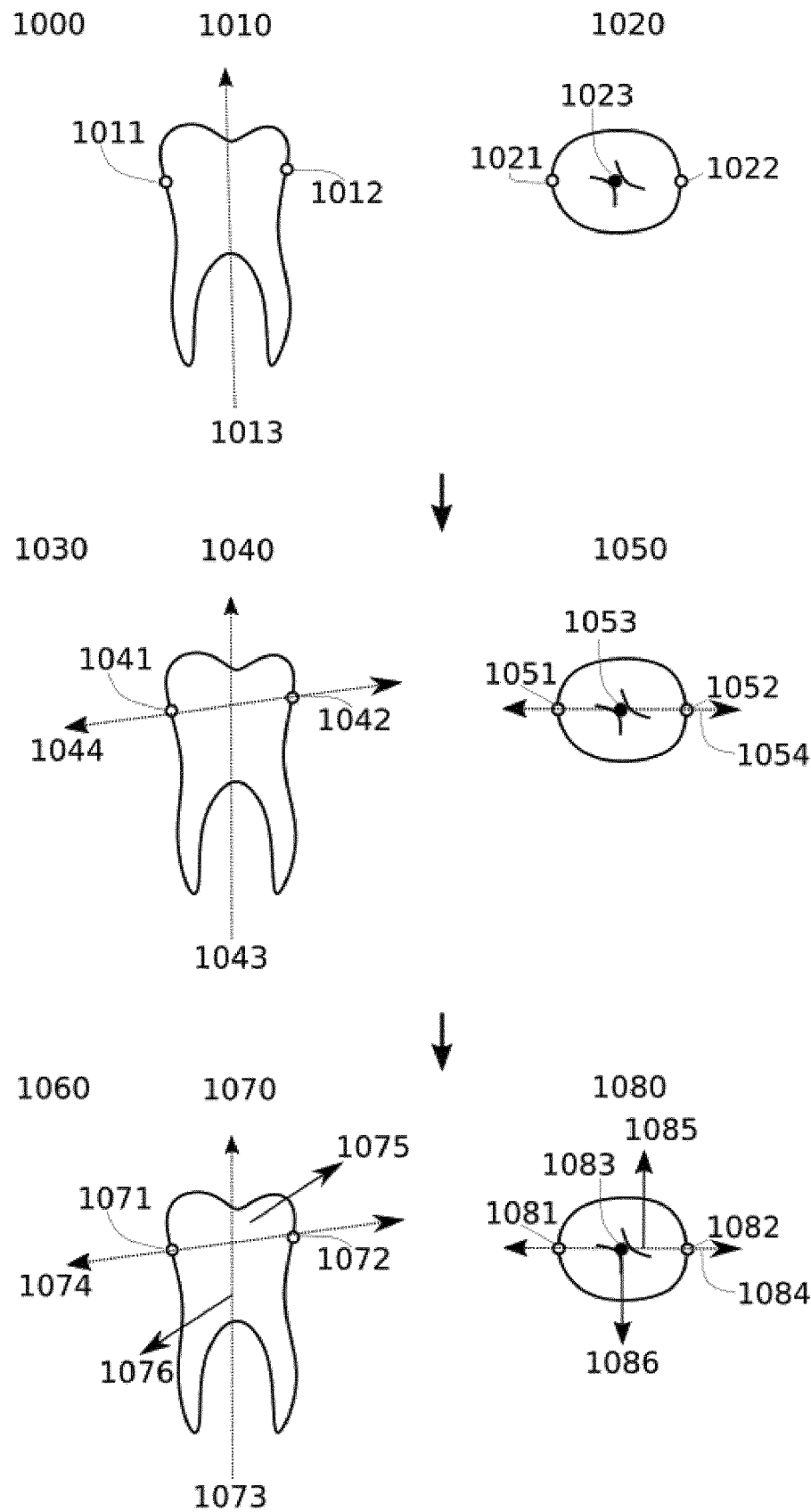
FIG. 10 shows a method of finding a projection direction according to an embodiment.

FIG. 10 shows a method of finding a projection direction.

Step 1000 shows a tooth with a mesial point, distal point, and a tooth long axis. Tooth side view 1010 shows a mesial point 1011, a distal point 1012, and a tooth long axis 1013. Tooth top view 1020 shows the same tooth and features from the side, with mesial point 1021, distal point 1022, and tooth long axis 1023. Although here, the top view lines up with the tooth long axis, that need not be the case.

Step 1030 shows the tooth with a mesial-distal axis. Tooth side view 1040 shows mesial point 1041, distal point 1042, tooth long axis 1043, and mesial-distal axis 1044. Tooth top view 1050 shows the same tooth and features from the side, with mesial point 1051, distal point 1052, tooth long axis 1053, and mesial-distal axis 1054. The tooth long axis 1043/1053 intersects the mesial-distal axis 1044/1054, and the projection plane can be defined by these two axes. The projection plane roughly divides the tooth into lingual and buccal sides.

Step 1060 shows two examples of projection direction vectors. Tooth side view 1070 shows mesial point 1071, distal point 1072, tooth long axis 1073, mesial-distal axis 1074, and projection direction vectors 1075 and 1076. Tooth top view 1080 shows mesial point 1081, distal point 1082, tooth long axis 1083, mesial-distal axis 1084, and projection direction vectors 1085 and 1086. The projection direction vectors 1075/1085 and 1076/1086 are normal to the plane defined by the tooth long axis 1073/1083 and the mesial-distal axis 1074/1084, and their directions can be used as a projection direction to get a dental model point onto the surface. As can be seen from the illustration; the projection direction vectors 1075/1085 and 1076/1086 are opposite to each other; one direction points to the buccal surface and the other points to the lingual surface.

Although this illustration uses the normal of a projection plane to find a projection direction, other embodiments may use lines or vectors of other angles.

FIG. 11 shows methods of fitting the edge curve over a terminal tooth.

Figure 11A:
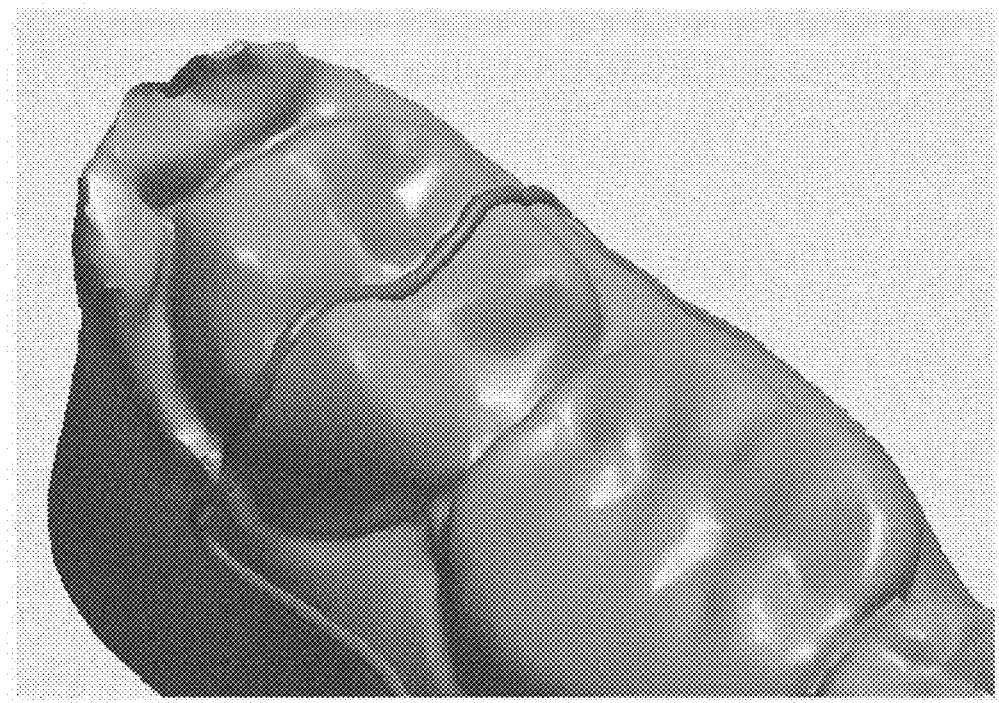
FIG. 11A-B shows methods of fitting the edge curve over a terminal tooth according to an embodiment.

FIG. 11A shows an edge curve generated in part by fitting the edge curve to a terminal tooth point that is a mesial-distal midpoint projected to the surface. Here, the edge curve includes offset points for the final tooth, and the terminal tooth point takes the edge curve through the center of the occlusal surface of terminal tooth.

Figure 11B:
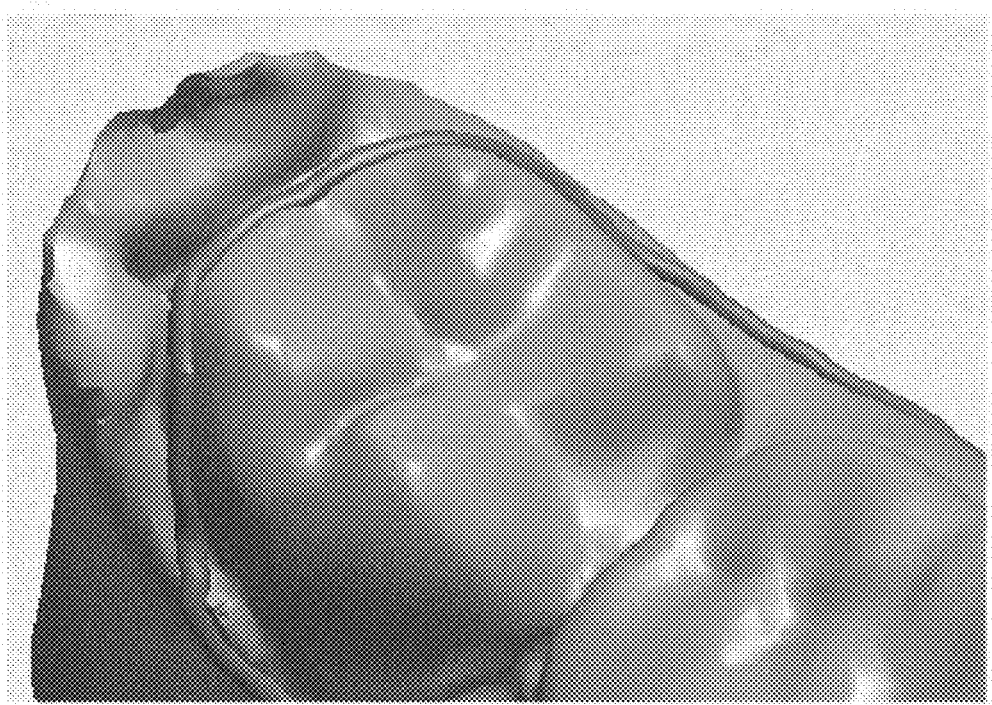

FIG. 11B shows a edge curve generated in part by fitting the edge curve over a terminal tooth by fitting the edge curve to three margin line point shifted upwards onto the tooth. As can be seen, the edge curve fits over most of the terminal tooth.

Figure 12A:
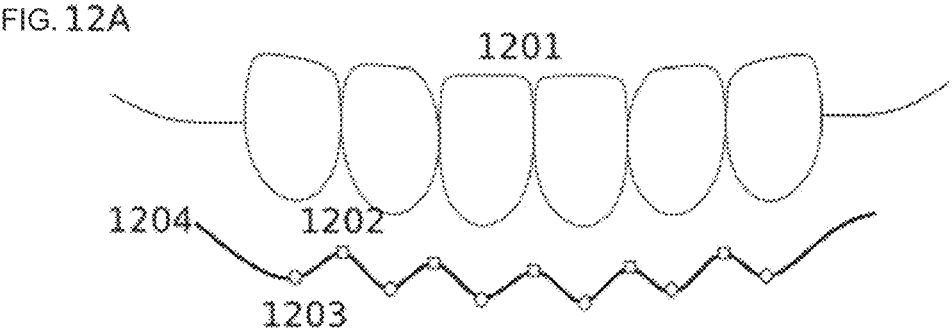
FIG. 12A-C shows how the offset distance can control the edge curve according to an embodiment.
Figure 12B:
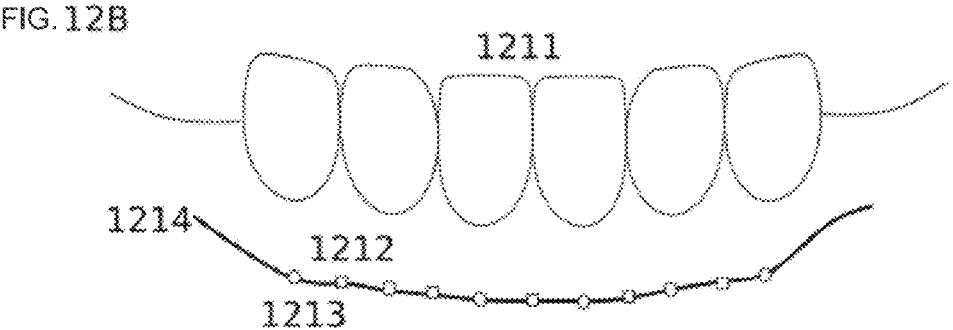
Figure 12C:
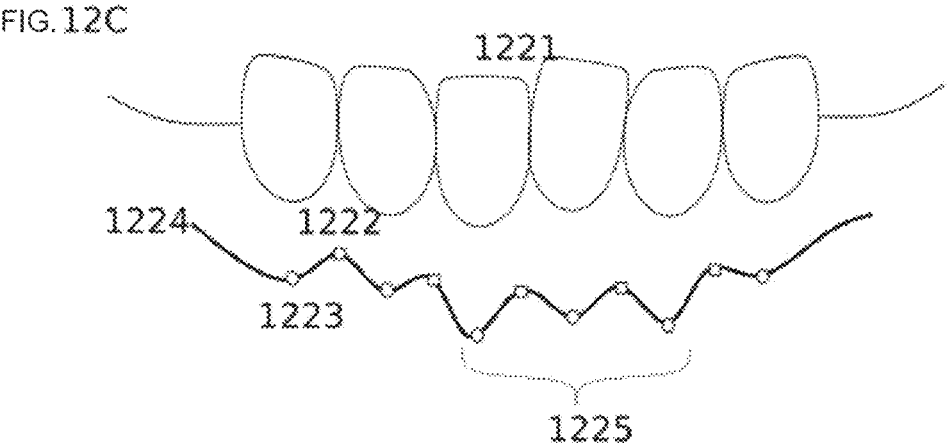

FIG. 12A-C shows how setting the offset distance can control the edge curve.

FIG. 12A shows an edge curve 1204 generated for the buccal side of a set of teeth 1201. Here, the second offset distance is not zero, as can be seen by the different between the offset points from tooth reference points 1203 (dots) and the offset points from control points 1202 (squares). Hence, the edge curve 1204 is wavy may be suitable for the buccal side.

FIG. 12B shows an edge curve 1214 generated for the lingual side of a set of teeth 1211. Here, the second offset distance is zero, and the offset points from tooth reference points 1213 (dots) and the offset points from control points 1214 (squares) are lined up. Hence, the edge curve 1214 is straighter may be suitable for the lingual side.

FIG. 12C shows an edge curve 1224 generated for a dental model where one tooth need extra correction. The edge curve 1224 is defined by offset points from tooth reference points 1223 (dots) and offset points from control points 1222 (squares). Here, the offset distance for offsets points 1225 is set higher than the others, allowing the edge curve to provide a more secure fit for that area.

Figure 13:
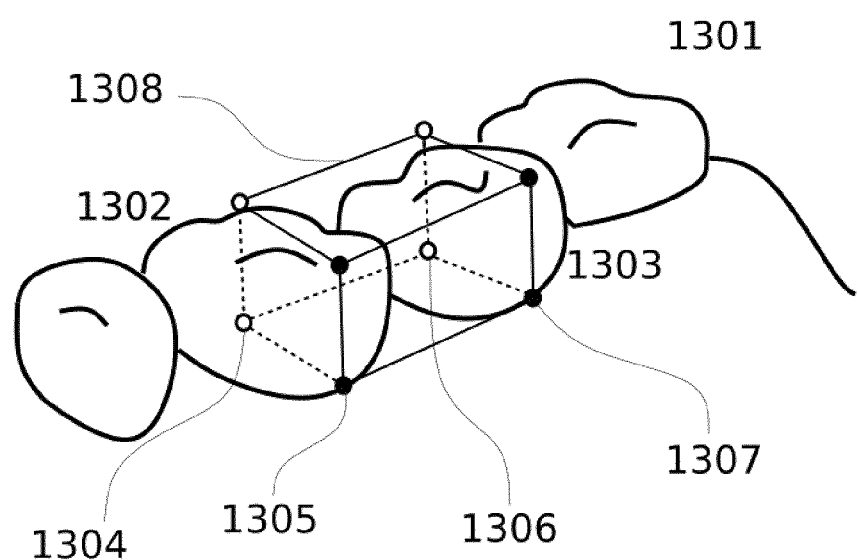
FIG. 13 shows a bounding box according to an embodiment.

FIG. 13 shows a bounding box.

In an embodiment, bounding boxes are used to identify if a point is in an interproximal area. Here, the bounding box 1308 is shown. The dental model 1301 has teeth 1302 and 1303. Tooth 1302 has a lingual visible apex 1304 and a buccal visible apex 1305. Tooth 1303 has a lingual visible apex 1306 and a buccal visible apex 1307. Visible apices 1304, 1305, 1306, and 1307 are translated opposite an offset direction by a pre-determined distance, for example, 1 cm. A bounding box 1308 is the space bounded by the visible apices 1304, 1305, 1306, and 1307, and their translations.

This figure shows only a single bounding box, for clarity. However, multiple bounding boxes may be used, for example, a bounding box for each pair of adjacent teeth.

Figure 14:
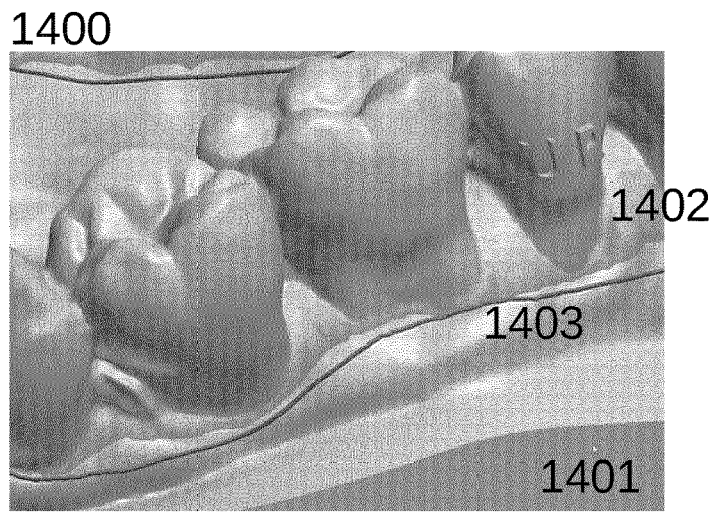
FIG. 14 shows an embodiment displaying an original curve section and a modified curve section.
Figure 14:
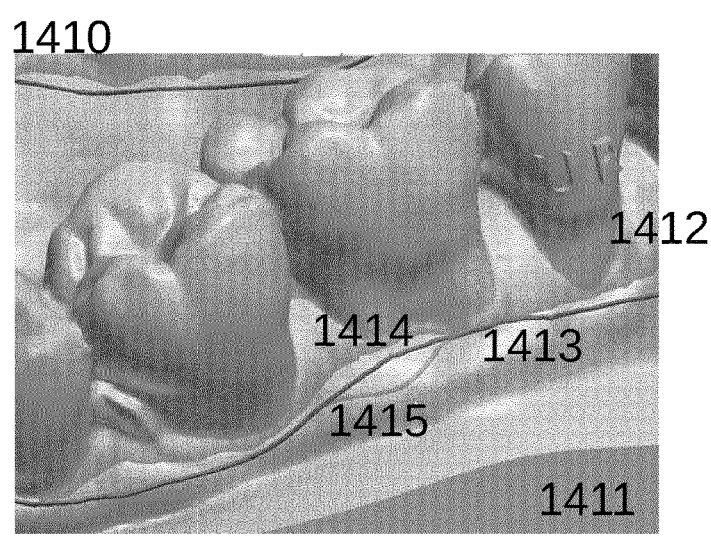
Figure 14:
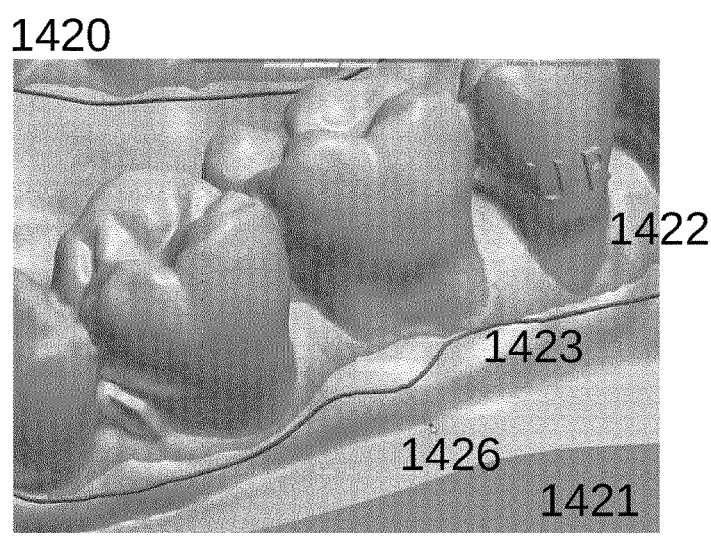

FIG. 14 shows an embodiment displaying an original curve section and a modified curve section.

In Step 1400, an edge curve 1403 on a digital dental model 1401 is shown, along with a validation area 1402. A validation area may define an area that the edge curve is prevented from going into, e.g., due to clinical or mechanical constraints. For example, a minimum width may be demarcated by a validation area. The validation area may include an interproximal area, which may for example be defined by a bounding box.

In Step 1410, an edge curve 1413 on a digital dental model 1411 is shown, along with a validation area 1412. The edge curve 1413 comprises original curve section 1414 and modified curve section 1415. Curve sections 1414 and 1415 are shown at different transparencies to distinguish between them, and modified curve section 1415 remains outside the validation area 1412.

In Step 1420, modified edge curve 1423 on a digital dental model 1411 is shown, along with a validation area 1412. Note that the modified curve section 1415 is now part of the edge curve, and original curve section 1414 is not. As such the edge curve is still valid based on validation area 1422. Note also that cursor 1426 may be used to find a user-input point.

Figure 15A:
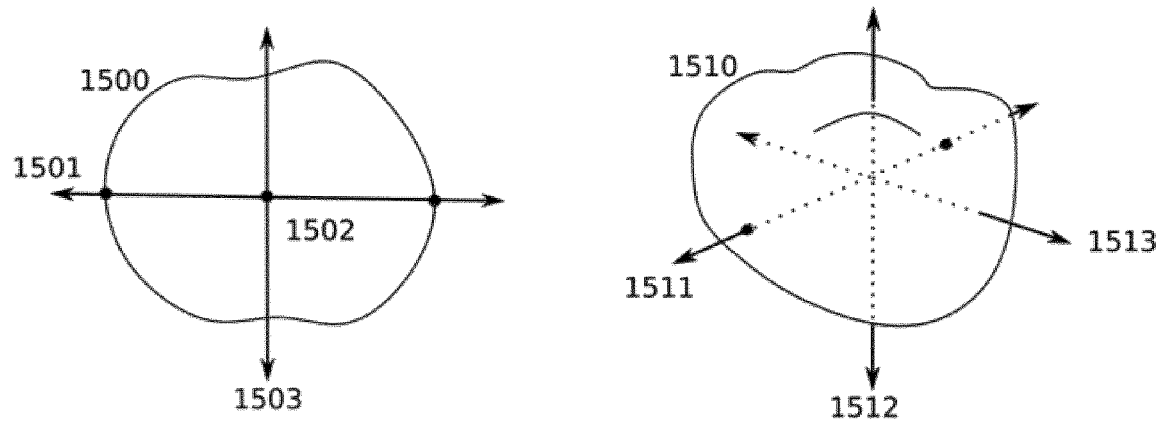
FIG. 15A-C show methods of generating a limited part according to an embodiment.
Figure 15B:
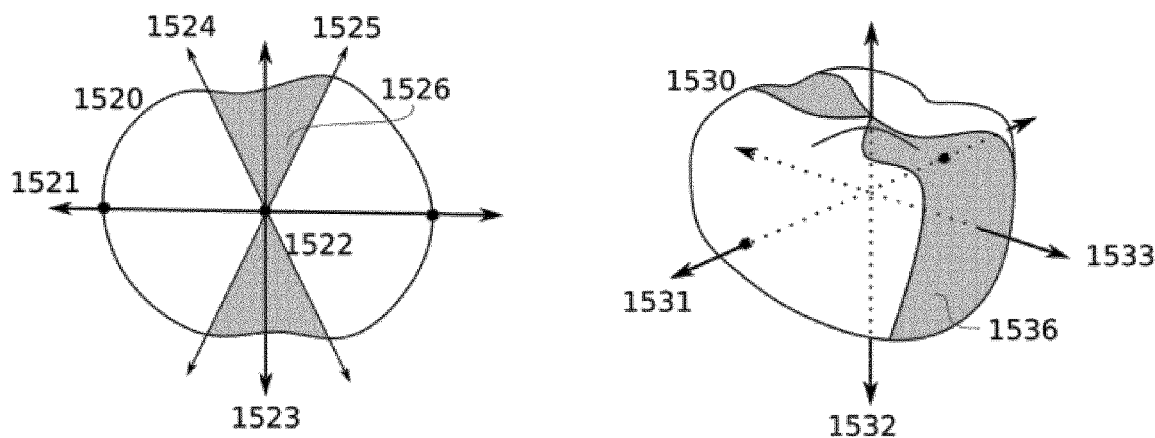
Figure 15C:
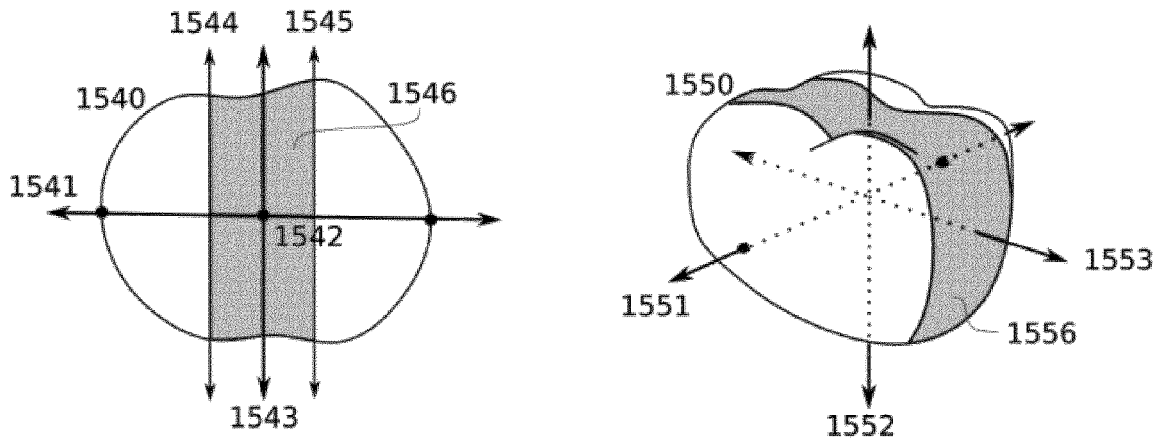

FIG. 15A-C show methods of generating a limited part.

FIG. 15A shows an embodiment of a tooth and relevant axes, from both an occlusal view (1500-1503) and an angled view (1510-1513). Tooth 1500/1510 may have a corresponding mesial-distal axis 1501/1511 comprising a mesial point and a distal point, tooth long axis 1502/1512, and a lingual-buccal axis 1503/1513.

FIG. 15B shows an embodiment of a tooth and relevant axes, from both an occlusal view (1520-1526) and an angled view (1530-1536). Tooth 1520/1530 may have a corresponding mesial-distal axis 1521/1531 comprising a mesial point and a distal point, tooth long axis 1522/1532, and a lingual-buccal axis 1523/1533.

The embodiment further comprises a first limitation plane 1524, generated by rotating a lingual-buccal axis counter-clockwise and translating the rotated axis along the tooth long axis 1522/1530. It also comprises a second limitation plane 1525, generated by rotating a lingual-buccal axis clockwise and translating the rotated axis along the tooth long axis 1522/1530. The limitation planes 1524 and 1525 are not shown in the angled view 1530-1536 for clarity.

The limitation planes 1524 and 1525 may be used to define the limited part 1526/1536. As discussed above, the dimension of the limited part depends on the underlying model. In the angled view, limited part 1536 is shown as an area on the surface of tooth 1530, though in other embodiments, it may be a length and/or volume.

FIG. 15B shows an embodiment with a limited part based on a rotated lingual-buccal axis, from both an occlusal view (1520-1526) and an angled view (1530-1536).

Tooth 1520/1530 may have a corresponding mesial-distal axis 1521/1531 comprising a mesial point and a distal point, tooth long axis 1522/1532, and a lingual-buccal axis 1523/1533.

The embodiment further comprises a first limitation plane 1524, generated by rotating a lingual-buccal axis counter-clockwise and translating the rotated axis along the tooth long axis 1522/1530. It also comprises a second limitation plane 1525, generated by rotating a lingual-buccal axis clockwise and translating the rotated axis along the tooth long axis 1522/1530. The limitation planes 1524 and 1525 are not shown in the angled view 1530-1536 for clarity.

The limitation planes 1524 and 1525 may be used to define the limited part 1526/1536. As discussed above, the dimension of the limited part depends on the underlying model. In the angled view, limited part 1536 is shown as an area on the surface of tooth 1530, though in other embodiments, it may be a length and/or volume.

FIG. 15C shows an embodiment with a limited part based on a translated lingual-buccal axis, from both an occlusal view (1540-1546) and an angled view (1550-1556). Tooth 1540/1550 may have a corresponding mesial-distal axis 1541/1551 comprising a mesial point and a distal point, tooth long axis 1542/1552, and a lingual-buccal axis 1543/1553.

The embodiment further comprises a first limitation plane 1544, generated by translating a lingual-buccal axis in a mesial direction and translating the translated axis along the tooth long axis 1542/1550. It also comprises a second limitation plane 1545, generated by translating a lingual-buccal axis in a distal direction and translating the translated axis along the tooth long axis 1542/1550. The limitation planes 1544 and 1545 are not shown in the angled view 1550-1556 for clarity.

The limitation planes 1544 and 1545 may be used to define the limited part 1546/1556. As discussed above, the dimension of the limited part depends on the underlying model. In the angled view, limited part 1556 is shown as an area on the surface of tooth 1550, though in other embodiments, it may be a length and/or volume.

REFERENCES

Breen, Scott P., Nicole M. Etter, Gregory R. Ziegler, and John E. Hayes. "Oral somatosensatory acuity is related to particle size perception in chocolate." *Nature Scientific Reports* 9, no. 1 (2019): 7437.

Bartels, Richard H., John C. Beatty, and Brian A. Barsky. *An introduction to splines for use in computer graphics and geometric modeling*. Morgan Kaufmann, 1995. Shamir, Ariel. "A survey on mesh segmentation techniques." In *Computer graphics forum*, vol. 27, no. 6, pp. 1539-1556. Oxford, UK: Blackwell Publishing Ltd, 2008. Ericson, Christer. *Real-time collision detection*. CRC Press, 2004.

The invention claimed is:

1. A computer-implemented method for generating an edge curve to facilitate cutting at least a portion of a dental device, said method comprising:
    identifying at least one tooth reference point for each of at least two teeth on a dental model;
    identifying at least one offset point corresponding to each of said at least one tooth reference points such that said at least one offset point is on a gingival surface of said dental model and positioned outside an interproximal area; and
    generating said edge curve by connecting the offset points such that the edge curve is outside the interproximal area and on the gingival surface;
    wherein the at least two teeth comprises a first tooth and a second tooth, further comprising:
    identifying at least one control point in a region defined by at least three of: a first visible apex corresponding to a first tooth, a second visible apex corresponding to a second tooth, a first offset point corresponding to the first visible apex, and/or a second offset point corresponding to the second visible apex, the at least one control point lying on the gingival surface outside the interproximal area; and
    generating the edge curve by connecting the first offset point, the at least one control point, and the second offset point.

2. A method according to claim 1, further comprising:
    identifying said at least one control point based on a point between two offset points and/or tooth reference points, wherein the point between is projected onto the surface.

3. A method according to claim 1, further comprising identifying at least one offset point by:
    displacing a corresponding dental model point based on a offset distance and a offset direction, wherein a corresponding dental model point is a tooth reference point or a control point.

4. A method according to claim 3, further comprising identifying the offset direction for an instance of the at least one offset point a by:
    identifying a set of dental model data;
    processing said dental model data through a mathematical model to generate an offset plane; and
    determining the offset direction based on the offset plane.

5. A method according to claim 3, further comprising a method of displacement to identify the at least one offset point by:
    translating a corresponding dental model point along the surface of the dental model in the offset direction by the offset distance.

6. A method according to claim 3, further comprising identifying the at least one offset point by:
    translating said corresponding dental model point in the offset direction by the offset distance; and
    projecting translated said corresponding dental model point onto the surface.

7. A method according to claim 1, further comprising projecting a dental model point onto a surface of the dental model by:
    identifying an area of interest on the surface of said dental model; and
    identifying as a surface point a point on said area of interest closest to said dental model point.

8. A method according to claim 1, further comprising fitting the edge curve to a terminal tooth by:
   identifying at least one terminal tooth point for the terminal tooth; and
   fitting said edge curve through the at least one terminal tooth point.

9. A method of claim 1, further comprising identifying a visible apex from a limited part of an oral situation, tooth, gingiva and/or margin line.

10. A method of claim 1, further comprising identifying a limited part by:
    identifying a mesial-distal axis;
    identifying a tooth long axis for the tooth;
    identifying a lingual-buccal axis based on an orthogonal of the tooth long axis and the mesial distal axis; and
    generating at least one limitation of an oral situation, tooth, gingiva, and/or margin line based on the lingual-buccal axis.

11. A method of claim 1, further comprising identifying a visible apex from a limited part based on a bounding box.

12. A method according to claim 1, further comprising generating a digital data format suitable for manufacturing a physical object based on said edge curve.

13. A method according to claim 1, wherein said a dental device may be from a list comprising: an aligner, a mouthguard, a splint, an indirect bonding tray, and/or any portion thereof.

14. A computer-implemented method for generating an edge curve to facilitate cutting at least a portion of a dental device, said method comprising:
    identifying at least one tooth reference point for each of at least two teeth on a dental model;
    identifying at least one offset point corresponding to each of said at least one tooth reference points such that said at least one offset point is on a gingival surface of said dental model and positioned outside an interproximal area; and
    generating said edge curve by connecting the offset points such that the edge curve is outside the interproximal area and on the gingival surface;
    further comprising identifying a visible apex by:
    identifying at least a part of a margin line of a tooth;
    identifying at least one margin line point along on said at least a part of a margin line; evaluating a measurement of each said at least one margin line point compared to a reference; and
    selecting as the visible apex a margin line point with an optimal measurement.

15. A computer-implemented method for generating an edge curve to facilitate cutting at least a portion of a dental device, said method comprising:
    identifying at least one tooth reference point for each of at least two teeth on a dental model;
    identifying at least one offset point corresponding to each of said at least one tooth reference points such that said at least one offset point is on a gingival surface of said dental model and positioned outside an interproximal area; and
    generating said edge curve by connecting the offset points such that the edge curve is outside the interproximal area and on the gingival surface;
    further comprising projecting a dental model point onto a surface of the dental model by: identifying a tooth corresponding to the dental model point, wherein the at least two teeth comprises the tooth and wherein the dental model point is a point in, on, and/or within a specific distance of the dental model;
    identifying a projection plane for the tooth corresponding to the dental model point; and
    translating the dental model point in a projection direction based on the projection plane such that the dental model point is on the surface of the dental model, wherein the projection direction is calculated based on the projection plane.

* * * * *